(12) United States Patent
Park et al.

(10) Patent No.: US 12,099,679 B2
(45) Date of Patent: Sep. 24, 2024

(54) TOUCH DISPLAY DEVICE

(71) Applicant: LG Display Co., Ltd., Seoul (KR)

(72) Inventors: Je Hyung Park, Seoul (KR); Da Yeong Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/063,013

(22) Filed: Dec. 7, 2022

(65) Prior Publication Data

US 2023/0185400 A1    Jun. 15, 2023

(30) Foreign Application Priority Data

Dec. 9, 2021   (KR) .................. 10- 2021-0175919

(51) Int. Cl.
*G06F 3/041*   (2006.01)
*G06F 3/044*   (2006.01)

(52) U.S. Cl.
CPC ...... *G06F 3/04164* (2019.05); *G06F 3/04166* (2019.05); *G06F 3/0443* (2019.05); *G06F 3/0446* (2019.05)

(58) Field of Classification Search
CPC ............. G06F 3/04164; G06F 3/04166; G06F 3/0443; G06F 3/0446; G06F 3/0445; G06F 2203/04107; G06F 2203/04112; G06F 3/0412
See application file for complete search history.

(56) References Cited

U.S. PATENT DOCUMENTS 9,158,421 B2 * 10/2015 Kurasawa ............. G06F 3/0445
10,289,246 B2 * 5/2019 Zhuang ................. G06F 3/0445
11,409,386 B2 * 8/2022 Lee ....................... G06F 3/0412
11,662,868 B2 * 5/2023 Oh ........................ G06F 3/0446
                                                                 345/174
11,816,285 B2 * 11/2023 Ito ....................... G06F 3/04166
2008/0276213 A1 * 11/2008 Aoki .................... G06F 30/394
                                                                 716/129
2013/0314625 A1 * 11/2013 Tsai .................... G02F 1/13338
                                                                 349/12
2014/0092051 A1 * 4/2014 Weinerth ............. G06F 3/0443
                                                                 345/174
2014/0111442 A1 * 4/2014 Cok ...................... G06F 3/0445
                                                                 345/173
2014/0292711 A1 * 10/2014 Teranishi ................. G06F 1/26
                                                                 345/212
2016/0026302 A1 * 1/2016 Li ......................... G06F 3/0446
                                                                 345/82

(Continued)

FOREIGN PATENT DOCUMENTS

KR       20200143628 A       12/2020

*Primary Examiner* — Amy Onyekaba
(74) *Attorney, Agent, or Firm* — Seed IP Law Group LLP

(57) ABSTRACT

The disclosure discloses a touch display device includes, at a display panel including a display area and a non-display area surrounding the display area, a plurality of X-touch electrode lines extending in a first direction and receiving a touch driving signal, a plurality of Y-touch electrode lines extending in a second direction and transmitting a touch sensing signal, a plurality of X-touch lines extending in the second direction and transmitting the touch driving signal, at least one pseudo-touch routing line disposed at an outermost portion of the display panel, and at least one pseudo-touch electrode line extending from the at least one pseudo-touch routing line.

36 Claims, 14 Drawing Sheets

(56) References Cited

U.S. PATENT DOCUMENTS

| | | | |
|---|---|---|---|
| 2016/0041654 A1* | 2/2016 | Bulea | G06F 3/041 |
| | | | 345/174 |
| 2016/0307971 A1* | 10/2016 | Jeon | G09G 3/3233 |
| 2018/0129330 A1* | 5/2018 | Ding | G06F 3/0443 |
| 2018/0181251 A1* | 6/2018 | Bolender | G06F 3/041661 |
| 2019/0220123 A1* | 7/2019 | Kanaya | H10K 59/40 |
| 2019/0237533 A1* | 8/2019 | Kim | G06F 3/04164 |
| 2019/0317641 A1* | 10/2019 | Maruyama | G06F 3/0446 |
| 2020/0278587 A1* | 9/2020 | Fukami | H01L 27/124 |
| 2020/0300900 A1* | 9/2020 | Bolender | G06F 3/044 |
| 2020/0401258 A1* | 12/2020 | Kang | G09G 3/3685 |
| 2021/0064172 A1* | 3/2021 | Lee | H10K 50/84 |
| 2021/0103354 A1* | 4/2021 | Kim | G06F 1/1626 |
| 2021/0157432 A1* | 5/2021 | Lee | G06F 3/0412 |
| 2021/0200414 A1* | 7/2021 | Lee | G06F 3/0412 |
| 2021/0223940 A1* | 7/2021 | Li | G06F 3/04186 |
| 2021/0367001 A1* | 11/2021 | Chen | H10K 59/40 |
| 2021/0391407 A1* | 12/2021 | Yoon | G06F 1/189 |
| 2022/0075483 A1* | 3/2022 | Yan | G06F 3/0446 |
| 2022/0336537 A1* | 10/2022 | Chen | G06F 3/04164 |
| 2022/0382432 A1* | 12/2022 | Yan | G06F 3/0446 |
| 2022/0384697 A1* | 12/2022 | Lin | H01L 27/156 |
| 2022/0391040 A1* | 12/2022 | Yan | G06F 3/0446 |
| 2023/0072599 A1* | 3/2023 | Nakanishi | G06F 3/0443 |
| 2023/0099369 A1* | 3/2023 | Vaze | G06F 3/0446 |
| | | | 345/174 |
| 2023/0297195 A1* | 9/2023 | He | G06F 3/04164 |
| | | | 345/174 |

\* cited by examiner

TOUCH DISPLAY DEVICE

CROSS-REFERENCE TO RELATED APPLICATION

This application claims the benefit of Korean Patent Application No. 10-2021-0175919 filed on Dec. 9, 2021, which is hereby incorporated by reference as if fully set forth herein.

BACKGROUND

Technical Field

The disclosure relates to a touch display device, and more particularly to a touch display device capable of reducing electromagnetic interference between a radio signal and a touch driving signal.

Description of the Related Art

With the progress of information-dependent society, various requirements for a display device for displaying an image are increasing. As such a display device, various display devices such as a liquid crystal display, an electroluminescent display, a quantum dot light emitting display, etc., are used.

Such a display device provides a function for recognizing finger touch or pen touch of a user on a display panel, and performing input processing based on the recognized touch.

For example, a touch display device capable of recognizing touch may include a plurality of touch electrodes disposed on or built in the display panel, and may detect whether or not there is touch of a user on the display panel, touch coordinates, etc., through driving of the touch electrodes.

The use range of such a touch display device is expanding not only to a mobile appliance such as a smartphone or a tablet computer, but also to a large-screen touch display device such as a display for an automobile, a display for exhibition, etc.

In addition, such a touch display device may be applicable not only to a mobile appliance such as a smartphone or a tablet computer, but also to a display for an automobile. In this case, the touch display device may use an antenna in order to communicate with other appliances.

BRIEF SUMMARY

For the touch display devices that uses an antenna, these devices may exhibit degradation of a transmission and reception performance for a radio signal and touch sensing performance due to the electromagnetic interference thereof with a touch driving signal in the case of transmitting and receiving a radio signal of a high-frequency band, such as 5G mmWave service.

Accordingly, one or more embodiments of the disclosure address the various technical problems in the related art including the technical problem identified above.

One or more embodiments of the disclosure provide a touch display device capable of reducing electromagnetic interference between a radio signal and a touch driving signal.

One or more embodiments of the disclosure provide a touch display device achieving an enhancement in electromagnetic interference offset performance through effective disposition of a pseudo-electrode disposed in a non-display area of the touch display device.

Additional advantages, technical benefits, and features of the disclosure will be set forth in part in the description which follows and in part will become apparent to those having ordinary skill in the art upon examination of the following or may be learned from practice of the disclosure. The benefits and other advantages of the disclosure may be realized and attained by the structure particularly pointed out in the written description and claims hereof as well as the appended drawings.

To achieve these technical benefits and in accordance with the purpose of the disclosure, as embodied and broadly described herein, a touch display device includes, at a display panel including a display area and a non-display area surrounding the display area, a plurality of X-touch electrode lines extending in a first direction and receiving a touch driving signal, a plurality of Y-touch electrode lines extending in a second direction and transmitting a touch sensing signal, a plurality of X-touch lines extending in the second direction and transmitting the touch driving signal, at least one pseudo-touch routing line disposed at an outermost portion of the display panel, and at least one pseudo-touch electrode line extending from the at least one pseudo-touch routing line.

The touch display device may further include a gate-in-panel (GIP) type gate driving circuit disposed in the non-display area. The at least one pseudo-touch electrode line may not overlap with the gate driving circuit.

The touch display device may further include a power line disposed along the non-display area. The at least one pseudo-touch electrode line may not overlap with the power line.

The at least one pseudo-touch electrode line may be disposed to be parallel to the X-touch electrode lines.

A pseudo-touch driving signal reverse in phase to the touch driving signal may be applied to the at least one pseudo-touch electrode line.

When the at least one pseudo-touch electrode line may include a plurality of pseudo-touch routing lines, the plurality of X-touch electrode lines may be divided into plural groups, and the plurality of pseudo-touch routing lines may correspond to the X-touch electrode lines of the plural groups, respectively.

The number of the pseudo-touch electrode lines of a first group extending from a first one of the pseudo-touch routing lines may be different from the number of the pseudo-touch electrode lines of a second group extending from a second one of the pseudo-touch routing lines.

A first pseudo-touch driving signal applied to the first-group pseudo-touch electrode lines may be reverse in phase to the touch driving signal applied to the X-touch electrode lines of a first group. A second pseudo-touch driving signal applied to the second-group pseudo-touch electrode lines may be reverse in phase to the touch driving signal applied to the X-touch electrode lines of a second group.

In another aspect of the disclosure, there is provided a touch display device including an encapsulation layer disposed in a display area and at least a portion of a non-display area surrounding the display area, a touch buffer layer disposed on the encapsulation layer, a plurality of X-touch electrode lines and a plurality of Y-touch electrode lines disposed on the touch buffer layer in the display area, and at least one pseudo-touch electrode line disposed on the touch buffer layer in the non-display area.

The at least one pseudo-touch electrode line may not overlap with the encapsulation layer.

The touch display device may further include a dam in the non-display area. The at least one pseudo-touch electrode line may not overlap with the dam.

The effects of the embodiments disclosed in the disclosure are not limited to the above-described effects, and other effects which are not described herein may be derived by those skilled in the art from the following description of the embodiments of the disclosure.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and along with the description serve to explain the principle of the disclosure. In the drawings.

DETAILED DESCRIPTION

Figure 1:
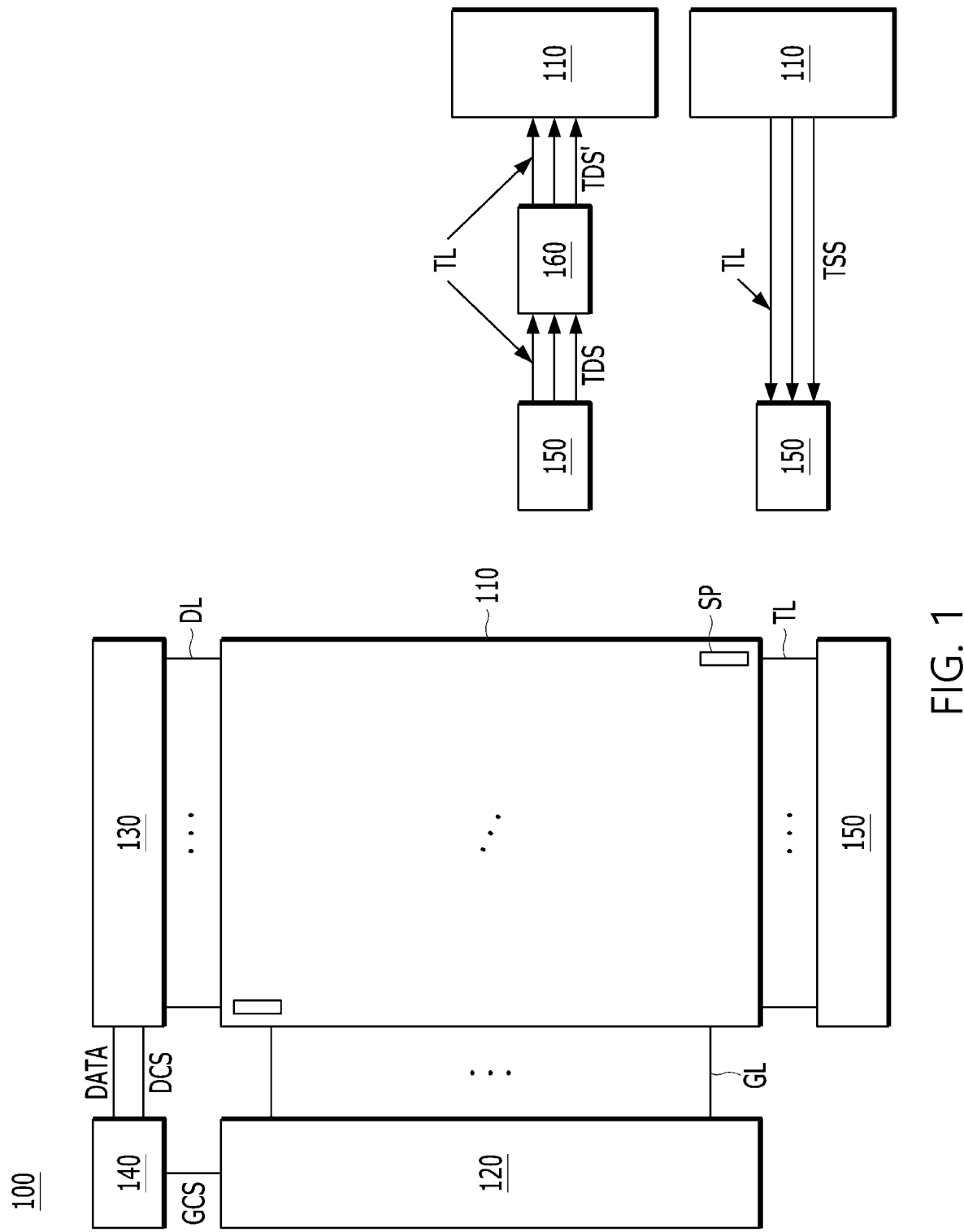
FIG. 1 is a block diagram showing a schematic configuration of a touch display device according to an example embodiment of the disclosure.

Advantages and features of the disclosure, and implementation methods thereof, will be clarified through the following embodiments described with reference to the accompanying drawings. However, the disclosure may be embodied in different forms and should not be construed as limited to the embodiments set forth herein. Rather, these embodiments are provided so that the disclosure will be thorough and complete, and will fully convey the scope of the disclosure to those skilled in the art. Further, the disclosure is defined only by the categories of the claims.

A shape, a size, a ratio, an angle, and a number disclosed in the drawings for describing embodiments of the disclosure are merely an example, and thus, the disclosure is not limited to the illustrated details. The same reference numerals designate substantially the same elements throughout the specification. In the following description, when the detailed description of the relevant known function or configuration is determined to unnecessarily obscure the gist of the disclosure, the detailed description will be omitted. When "comprise," "have," and "include" described in the specification are used, another part may be added unless "only~" is used. Terms in a singular form may include plural forms unless stated otherwise.

In construing an element, the element is construed as including a tolerance range, even if there is no explicit description.

In describing a positional relationship between two elements, for example, when the positional relationship is described using "upon~," "above~," "below~," and "next to~," one or more other elements may be interposed between the two elements unless "just" or "directly" is used.

In describing a temporal relationship, for example, when the temporal order is described as "after~," "subsequent~," "next~," and "before~," the case which is not continuous may also be included unless "just" or "directly" is used.

In describing a signal flow relationship, for example, even in the case in which a signal is transferred from a node A to a node B, this case may include the case in which a signal is transferred from the node A to the node B via another node, unless "just" or "directly" is used.

It will be understood that, although the terms "first," "second," etc., may be used herein to describe various elements, these elements should not be limited by these terms. These terms are only used to distinguish one element from another. For example, a first element referred to in the following description may represent a second element, without departing from the scope of the disclosure.

The following embodiments may be partially or overall coupled or combined, and may be technically linked and implemented in various manners. The embodiments may be independently implemented, or may be implemented in a co-dependent relationship.

Hereinafter, various embodiments of the disclosure will be described in detail.

FIG. 1 is a block diagram showing a schematic configuration of a touch display device according to an example embodiment of the disclosure.

Referring to FIG. 1, a touch display device 100 according to an example embodiment of the disclosure may include a display panel 110, a gate driving circuit 120, a data driving circuit 130, a timing controller 140, and a touch driving circuit 150 configured to sense touch on the display panel 110.

A plurality of gate lines GL and a plurality of data lines DL are disposed at the display panel 110, and a plurality of sub-pixels SP may be disposed in areas adjacent to where the gate lines GL and the data lines DL overlap each other.

In addition, a plurality of touch electrodes may be disposed on or built in the display panel 110, and a plurality of touch lines TL, which electrically interconnect the touch electrodes and the touch driving circuit 150, may be disposed at the display panel 110.

A configuration for display driving in the display device 100 will be first described. The gate driving circuit 120 controls driving timing of the sub-pixel SP disposed at the display panel 110. In addition, the data driving circuit 130 supplies a data voltage corresponding to image data to the sub-pixel SP. As a result, the sub-pixel SP emits light at a brightness corresponding to the grayscale of the image data and, as such, displays an image.

In detail, the gate driving circuit 120 is controlled by the timing controller 140, and sequentially outputs a scan signal to the plurality of gate lines GL disposed at the display panel 110, thereby controlling driving timing of the plurality of sub-pixels SP.

The gate driving circuit 120 may include one or more gate driving integrated circuits (GDICs), and may be disposed at only one side of the display panel 110 or at both sides of the display panel 110. Alternatively, the gate driving circuit 120 may be directly built in a bezel area of the display panel 110 and, as such, may be implemented in a gate-in-panel (GIP) type.

The data driving circuit 130 receives image data DATA having a digital form from the timing controller 140, and converts the image data DATA into a data voltage having an analog form. In addition, the data driving circuit 130 outputs data voltages to the data lines DL in accordance with timing of application of scan signals via the gate lines GL, respectively, thereby enabling the sub-pixels SP to represent brightness values according to the data voltages, respectively.

The data driving circuit 130 may include one or more source driving integrated circuits (SDICs).

The timing controller 140 supplies various control signals to the gate driving circuit 120 and the data driving circuit 130 and, as such, controls operations of the gate driving circuit 120 and the data driving circuit 130.

The timing controller 140 controls the gate driving circuit 120 to output a scan signal in accordance with timing implemented in each frame, converts image data DATA received from an exterior such that the image data is suitable for a data signal format used in the data driving circuit 130, and outputs the converted image data DATA to the data driving circuit 130.

The timing controller 140 receives, from the exterior (for example, a host system), various timing signals including a vertical synchronization signal, a horizontal synchronization signal, an input data enable signal, a clock signal, etc., together with the image data DATA.

The timing controller 140 may generate a data control signal DCS and a gate control signal GCS using the various timing signals received from the exterior, and may output the data control signal DCS and the gate control signal GCS to the data driving circuit 130 and the gate driving circuit 120, respectively.

For example, the timing controller 140 may output various gate control signals GCS including a gate start pulse, a gate shift clock, a gate output enable signal, etc., in order to control the gate driving circuit 120.

Here, the gate start pulse controls operation start timing of one or more gate driving integrated circuits constituting the gate driving circuit 120. The gate shift clock is a clock signal input in common to the one or more gate driving integrated circuits, and controls shift timing of a scan signal. The gate output enable signal designates timing information of the one or more gate driving integrated circuits.

In addition, the timing controller 140 outputs various data control signals DCS including a source start pulse, a source sampling clock, a source output enable signal, etc., in order to control the data driving circuit 130.

Here, the source start pulse controls data sampling start timing of one or more source driving integrated circuits constituting the data driving circuit 130. The source sampling clock is a clock signal for controlling sampling timing of data in each source driving integrated circuit. The source output enabling signal controls output timing of the data driving circuit 130.

The touch display device 100 as described above may further include a power management integrated circuit configured to supply various voltages or currents to the display panel 110, the gate driving circuit 120, the data driving circuit 130, the touch driving circuit 150, etc., or to control the various voltages or currents to be supplied.

Meanwhile, when an encapsulation layer is formed on the display panel 110, and a touch electrode is disposed on the encapsulation layer, the capacitance for driving of the touch electrode may increase. In this case, it may be beneficial to increase the level of a touch driving signal TDS for driving of the touch electrode. Accordingly, in some embodiments, a level shifter 160 may be added between the touch driving circuit 150 and the display panel 110 to control the level of the touch driving signal TDS.

In particular, since a display device for a vehicle has a larger screen than a mobile device, a load for transmitting a signal may be larger. Accordingly, the level shifter 160 receives the touch driving signal TDS, converts a signal level of the touch driving signal TDS into an amplified touch driving signal TDS', and then provides the amplified touch driving signal TDS' to touch electrodes TE on the display panel 110 by a plurality of touch lines TL. Also, a touch sensing signal TSS sensed through the touch electrodes TE may be transmitted to the touch driving circuit 150 without passing through the level shifter 160.

Figure 2:
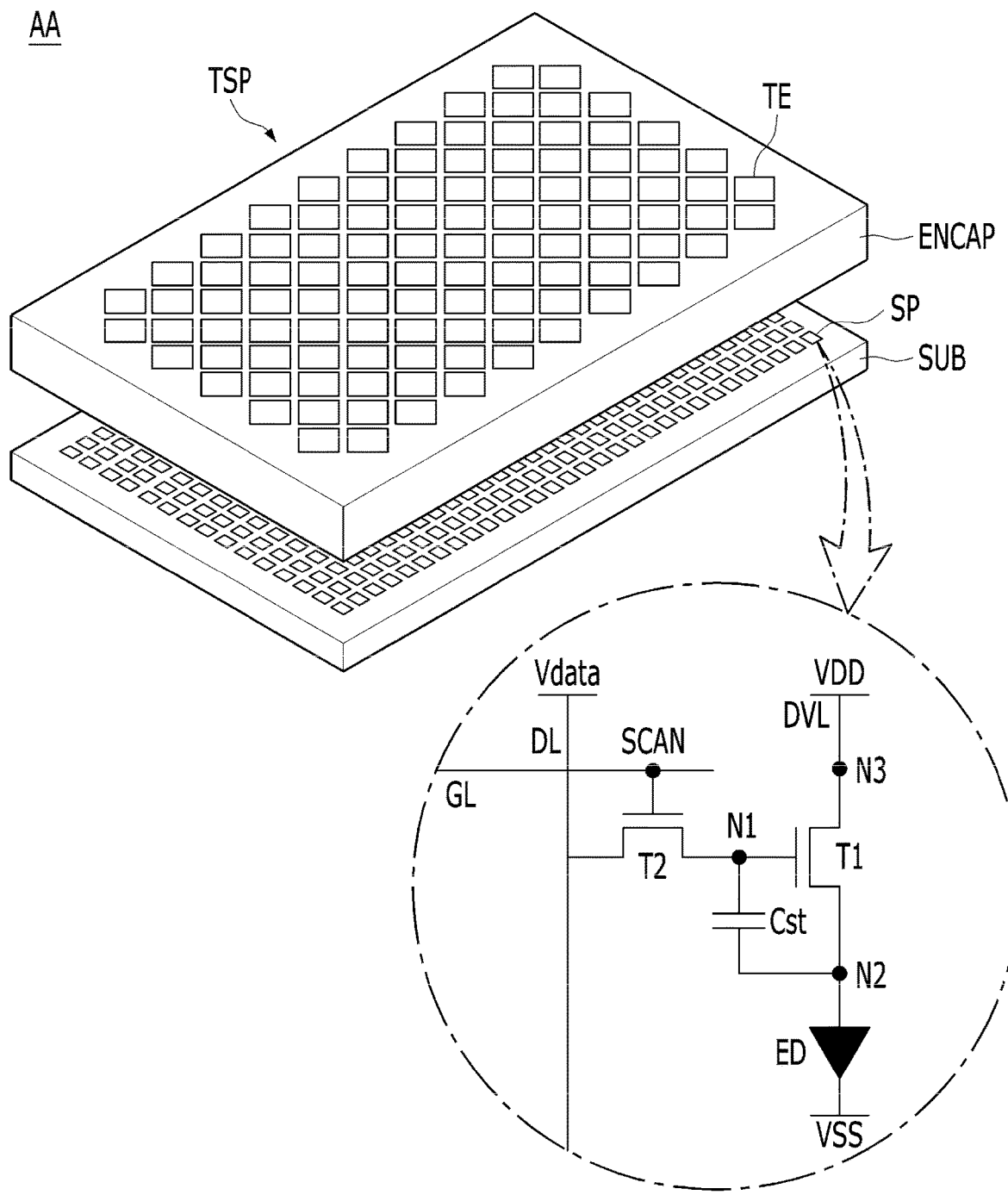
FIG. 2 is a view illustratively showing a structure in which a touchscreen panel is built in a display panel in a touch display device according to an example embodiment of the disclosure.

FIG. 2 is a view illustratively showing a structure in which a touchscreen panel is built in a display panel in a touch display device according to an example embodiment of the disclosure.

Referring to FIG. 2, in a touch display device 100 according to an example embodiment of the disclosure, a plurality of sub-pixels SP is arranged on a substrate SUB in a display area AA of a display panel 110.

Each sub-pixel SP may include a light emitting element ED, a first transistor T1 for driving the light emitting element ED, a second transistor T2 for transmitting a data voltage Vdata to a first node N1 of the first transistor T1, a storage capacitor Cst for maintaining a constant voltage for one frame, etc.

The first transistor T1 may include the first node N1, to which the data voltage Vdata is applied via the second transistor T2, a second node N2 electrically connected to the light emitting element ED, and a third node N3, to which a driving voltage VDD is applied from a driving voltage line DVL. The first node N1 is a gate node, the second node N2 may be a source node or a drain node, and the third node N3 may be a drain node or a source node. The first transistor T1 as described above may be referred to as a driving transistor for driving the light emitting element ED.

The light emitting element ED may include a first electrode (for example, an anode), a light emitting layer, and a second electrode (for example, a cathode). The first electrode may be electrically connected to the second node N2 of the first transistor T1, and a ground voltage VSS may be applied to the second electrode.

In the light emitting element ED as described above, the light emitting layer may be an organic light emitting layer including an organic material. In this case, the light emitting element ED may be an organic light emitting diode.

Turning-on/off of the second transistor T2 may be controlled by a scan signal SCAN applied to the second transistor T2 via a gate line GL, and the second transistor T2 may be electrically connected between the first node N1 of the first transistor T1 and a data line DL. The second transistor T2 as described above may be referred to as a switching transistor.

When the second transistor T2 is turned on by the scan signal SCAN, the data voltage Vdata supplied thereto via the data line DL is transmitted to the first node N1 of the first transistor T1.

The storage capacitor Cst may be electrically connected between the first node N1 and the second node N2 of the first transistor T1.

Each sub-pixel SP may have a 2T1C structure including two transistors T1 and T2 and one capacitor Cst. If necessary, each sub-pixel SP may further include one or more transistors, or may further include one or more capacitors.

The storage capacitor Cst may not be a parasitic capacitor, which may be present between the first node N1 and the second node N2 of the first transistor T1, but may be an external capacitor intentionally designed at an exterior of the first transistor T1.

Each of the first transistor T1 and the second transistor T2 may be an n-type or p-type transistor.

In addition, each of the first transistor T1 (for an example, a driving transistor) and the second transistor T2 (for an example, a switching transistor) may be constituted by a low-temperature polysilicon transistor. Of course, the example embodiments of the disclosure are not limited to the above-described condition, and at least one of the first transistor T1 and the second transistor T2 may be constituted by an oxide thin film transistor.

Meanwhile, a circuit element such as one light emitting element ED, two or more transistors T1 and T2, one or more capacitors Cst, etc., is provided. Since such a circuit element is weak against ambient moisture, oxygen or the like, an encapsulation layer ENCAP may be disposed on the display panel 110 in order to prevent ambient moisture or oxygen from penetrating the circuit element.

In the touch display device 100 according to the example embodiment of the disclosure, a touchscreen panel TSP may be formed on the encapsulation layer ENCAP and, as such, may be built in the display panel 110. That is, in the touch display device 100, a plurality of touch electrodes TE constituting the touchscreen panel TSP may be disposed on the encapsulation layer ENCAP, thereby constituting the display panel 110.

Figure 3:
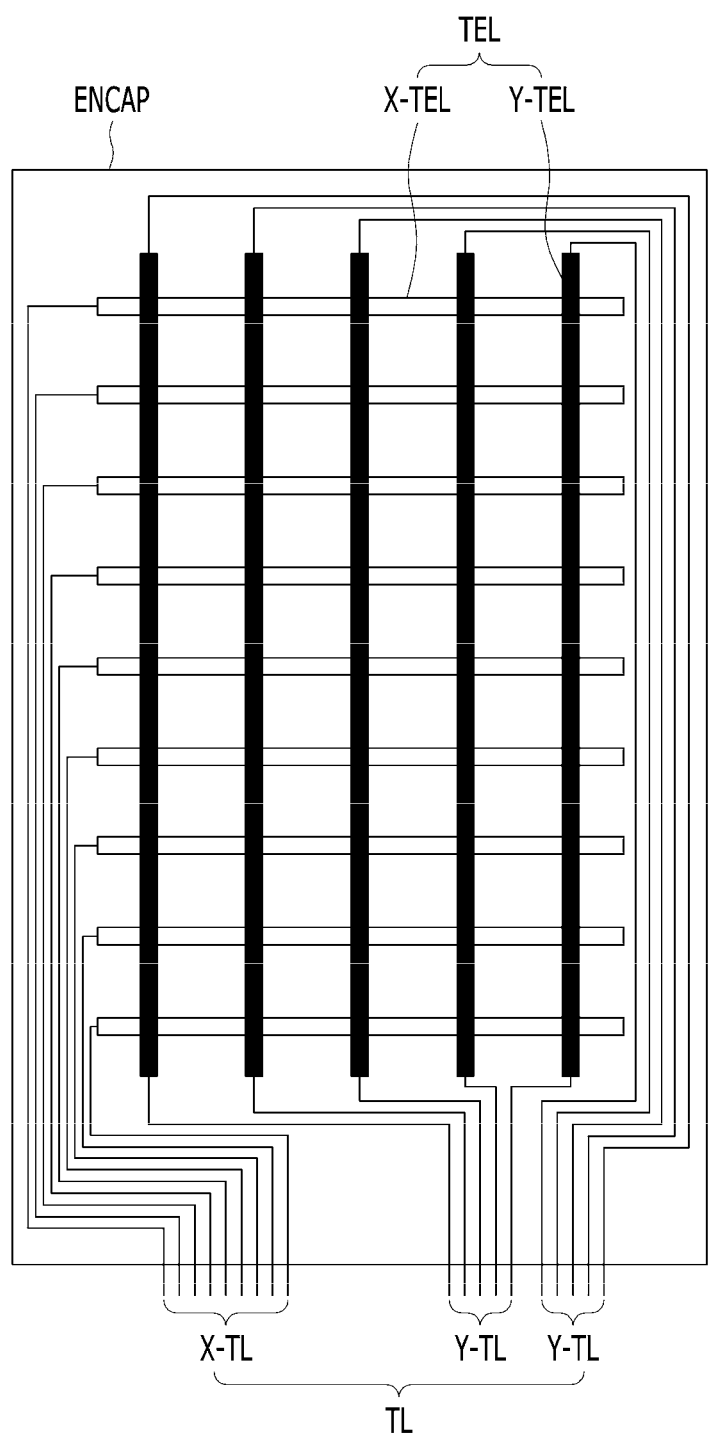
FIG. 3 is a diagram briefly showing a touch electrode structure for touch sensing based on mutual capacitance in a touch display device according to an example embodiment of the disclosure.

FIG. 3 is a diagram briefly showing a touch electrode structure for touch sensing based on mutual capacitance in a touch display device according to an example embodiment of the disclosure.

Referring to FIG. 3, in a touch display device 100 according to an example embodiment of the disclosure, a touch electrode structure thereof for touch sensing based on mutual capacitance may include a plurality of X-touch electrode lines X-TEL and a plurality of Y-touch electrode lines Y-TEL. In this case, the plurality of X-touch electrode lines X-TEL and the plurality of Y-touch electrode lines Y-TEL are disposed on an encapsulation layer ENCAP.

Each of the plurality of X-touch electrode lines X-TEL may be disposed to extend in a first direction, whereas each of the plurality of Y-touch electrode lines Y-TEL may be disposed to extend in a second direction different from the first direction.

In the disclosure, the first direction and the second direction may be directions relatively different from each other and, for example, the first direction may be an x-axis direction, and the second direction may be a y-axis direction. Conversely, the first direction may be the y-axis direction, and the second direction may be the x-axis direction. In addition, the first direction and the second direction may perpendicularly intersect each other or may not perpendicularly intersect each other. In addition, in the disclosure, a row and a column are relative to each other and, as such, may be interchanged in accordance with a viewing direction.

Each of the plurality of X-touch electrode lines X-TEL may be constituted by several X-touch electrodes that are electrically interconnected. Each of the plurality of Y-touch electrode lines Y-TEL may be constituted by several Y-touch electrodes that are electrically interconnected.

Here, the plurality of X-touch electrodes and the plurality of Y-touch electrodes are electrodes included in a plurality of touch electrodes TE while having functions distinguished from each other, respectively.

For example, the plurality of X-touch electrodes constituting each of the plurality of X-touch electrode lines X-TEL may be touch driving electrodes, whereas the plurality of Y-touch electrodes constituting each of the plurality of Y-touch electrode lines Y-TEL may be touch sensing electrodes. In this case, each of the plurality of X-touch electrode lines X-TEL corresponds to a touch driving electrode line, whereas each of the plurality of Y-touch electrode lines Y-TEL corresponds to a touch sensing electrode line.

Conversely, the plurality of X-touch electrodes constituting each of the plurality of X-touch electrode lines X-TEL may be touch sensing electrodes, whereas the plurality of Y-touch electrodes constituting each of the plurality of Y-touch electrode lines Y-TEL may be touch driving electrodes. In this case, each of the plurality of X-touch electrode lines X-TEL corresponds to a touch sensing electrode line, whereas each of the plurality of Y-touch electrode lines Y-TEL corresponds to a touch driving electrode line.

The touch electrode structure for touch sensing may include a plurality of touch lines TL in addition to the plurality of X-touch electrode lines X-TEL and the plurality of Y-touch electrode lines Y-TEL.

The plurality of touch lines TL may include one or more X-touch lines X-TL respectively connected to the plurality of X-touch electrode lines X-TEL, and one or more Y-touch lines Y-TL respectively connected to the plurality of Y-touch electrode lines Y-TEL.

Figure 4:
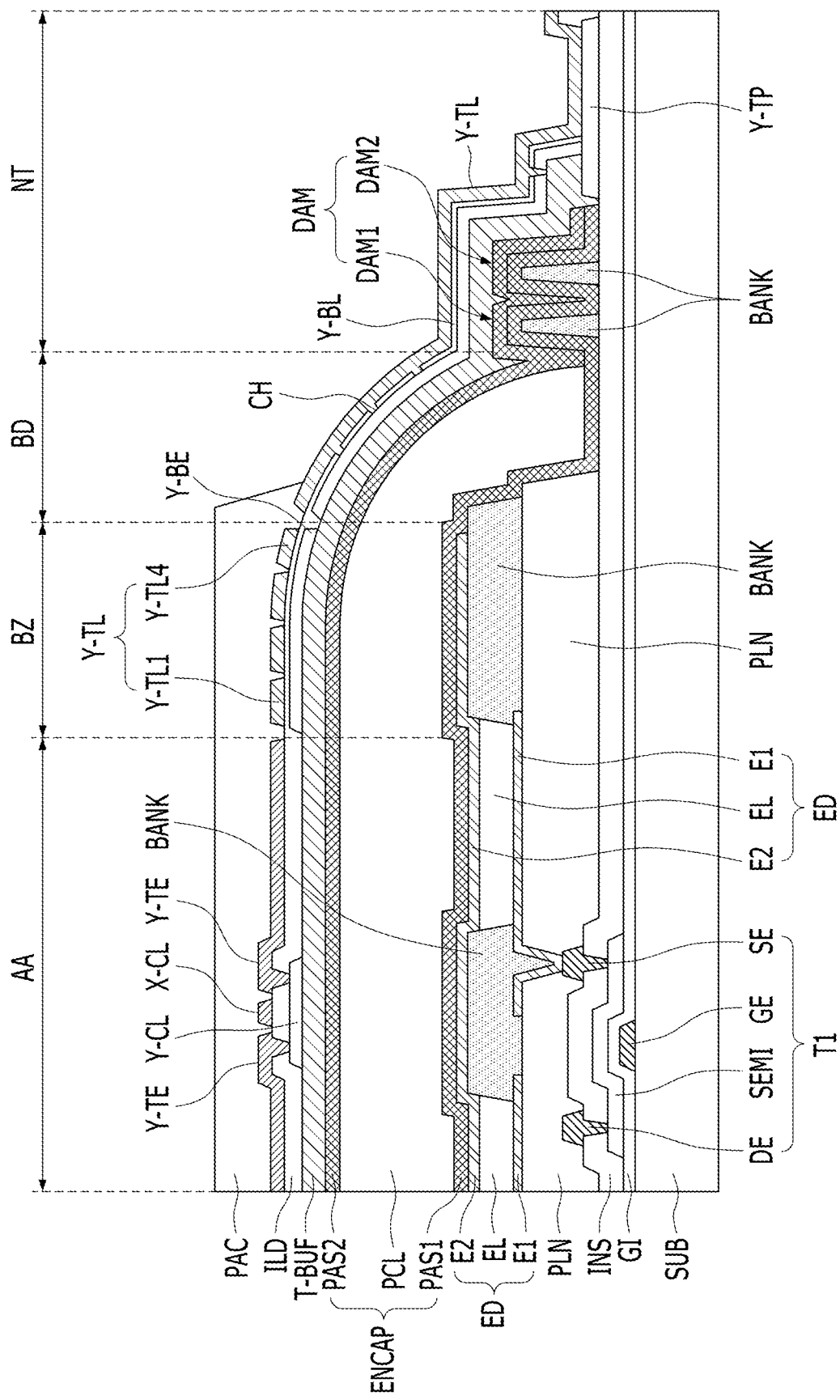
FIG. 4 is a view showing a cross-section of a touch display device according to an example embodiment of the disclosure.

FIG. 4 is a view showing a cross-section of a touch display device according to an example embodiment of the disclosure.

Although a Y-touch electrode Y-TE is shown in FIG. 4 as having a plate shape, this is only illustrative. The Y-touch electrode Y-TE may have a mesh shape.

Referring to FIG. 4, in a touch display device 100 according to an example embodiment of the disclosure, a first transistor T1, which is a driving transistor, may be disposed on a substrate SUB in a sub-pixel SP disposed in a display area AA.

The first transistor T1 may include a gate electrode GE, a source electrode SE, a drain electrode DE, and a semiconductor layer SEMI. In this case, the source electrode SE and the drain electrode DE may be made of the same material.

The gate electrode GE and the semiconductor layer SEMI may overlap each other under the condition that a gate insulating layer GI is interposed therebetween. The source electrode SE may be formed on an insulating layer INS such that the source electrode SE contacts one side of the semiconductor layer SEMI. The drain electrode DE may be formed on the insulating layer INS such that the drain electrode DE contacts the other side of the semiconductor layer SEMI.

A light emitting element ED may include a first electrode E1 corresponding to an anode (or a cathode), a light emitting layer EL formed on the first electrode E1, a second electrode E2 formed on the light emitting layer EL while corresponding to a cathode (or an anode), etc.

The first electrode E1 may be electrically connected to the source electrode SE of the first transistor T1 exposed through a contact hole extending through a planarization layer PLN.

The light emitting layer EL is formed on the first electrode E1 in a light emitting area provided by a bank BANK. The light emitting layer EL may be formed as a hole-related layer, a light emitting layer and an electron-related layer are stacked in this order or in a reversed order. The second electrode E2 may be formed to face the first electrode E1 under the condition that the light emitting layer EL is interposed therebetween.

An encapsulation layer ENCAP prevents ambient moisture or oxygen from penetrating the light emitting element ED, which is weak against ambient moisture or oxygen. The encapsulation layer ENCAP may be constituted by a single layer or may be constituted by a plurality of stacked structures PAS1, PCL and PAS2.

For example, when the encapsulation layer ENCAP is constituted by the plurality of stacked structures PAS1, PCL and PAS2, the encapsulation layer ENCAP may include one or more inorganic encapsulation layers PAS1 and PAS2, and one or more organic encapsulation layers PCL. In a concrete example, in the encapsulation layer ENCAP, a first inorganic encapsulation layer PAS1, an organic encapsulation layer PCL, and a second inorganic encapsulation layer PAS2 may be stacked in this order.

In this case, the organic encapsulation layer PCL may further include at least one organic encapsulation layer or at least one inorganic encapsulation layer.

The first inorganic encapsulation layer PAS1 may be formed on the substrate SUB formed with the second electrode E2, which corresponds to the cathode, such that the first inorganic encapsulation layer PAS1 is most adjacent to the light emitting element ED. The first inorganic encapsulation layer PAS1 may be formed of an inorganic insulating material capable of being deposited at a low temperature, such as silicon nitride ($SiN_x$), silicon oxide ($SiO_x$), silicon oxynitride (SiON) or aluminum oxide ($Al_2O_3$). Since the first inorganic encapsulation layer PAS1 is deposited in a low-temperature atmosphere, the first inorganic encapsulation layer PAS1 may prevent the light emitting layer EL including an organic material weak against a high-temperature atmosphere from being damaged in a procedure in which a deposition process is performed.

The organic encapsulation layer PCL may be formed to have a smaller area than the first inorganic encapsulation layer PAS1. In this case, the organic encapsulation layer PCL may be formed to expose opposite ends of the first inorganic encapsulation layer PAS1. The organic encapsulation layer PCL may perform a buffering function for alleviating stress among layers caused by bending of the touch display device, which is an organic light emitting display device, and a function for enhancing planarization performance. The organic encapsulation layer PCL may be formed of, for example, an organic insulating material such as acryl resin, epoxy resin, polyimide, polyethylene or silicon oxycarbide (SiOC).

Meanwhile, when the organic encapsulation layer PCL is formed through an inkjet method, one, two or more dams DAM may be formed in a dam area corresponding to a boundary area between a non-display area NA and a display area AA or a portion of the non-display area NA. The non-display area NA may refer to the rest of the area excluding the display area AA. The non-display area NA may include the bezel portion of the display.

For example, the dam area may be disposed between a pad area formed with a plurality of touch pads TP in the non-display area NA and the display area AA, and a primary dam DAM1 adjacent to the display area AA and a secondary dam DAM2 adjacent to the pad area may be present in the dam area.

The one or more dams DAM disposed in the dam area may prevent the organic encapsulation layer PCL, which is in a liquid state, from penetrating the pad area due to collapse thereof toward the non-display area when the liquid-state organic encapsulation layer PCL is stacked in the display area AA.

The primary dam DAM1 or the secondary dam DAM2 may be formed to have a single-layer structure or a multi-layer structure. For example, the primary dam DAM1 or the secondary dam DAM2 may be formed simultaneously with at least one of the bank BANK or a spacer (not shown) using the same material as the at least one of the bank BANK or the spacer. In this case, a dam structure may be formed without addition of a mask and an increase in cost.

In addition, the primary dam DAM1 or the secondary dam DAM2 may be formed to have a structure in which the first inorganic encapsulation layer PAS1 and the second inorganic encapsulation layer PAS2 are stacked on the bank BANK. In this case, the organic encapsulation layer PCL, which includes an organic material, may be disposed at an inner side surface of the primary dam DAM1 or may be disposed over at least a portion of the primary dam DAM1 and the secondary dam DAM2.

The second inorganic encapsulation layer PAS2 may be formed on the substrate SUB formed with the organic encapsulation layer PCL, to cover an upper surface and a side surface of each of the organic encapsulation layer PCL and the first inorganic encapsulation layer PAS1. The second inorganic encapsulation layer PAS2 reduces or prevents penetration of ambient moisture or oxygen into the first inorganic encapsulation layer PAS1 and the organic encapsulation layer PCL. The second inorganic encapsulation layer PAS2 as described above may be formed of an inorganic insulating material such as silicon nitride ($SiN_x$), silicon oxide ($SiO_x$), silicon oxynitride (SiON) or aluminum oxide ($Al_2O_3$).

A touch buffer layer T-BUF may be disposed on the encapsulation layer ENCAP. The touch buffer layer T-BUF may be disposed between a touch sensor metal, which includes touch electrodes X-TE and Y-TE and touch electrode connection lines X-CL and Y-CL, and the second electrode E2 of the light emitting element ED.

The touch buffer layer T-BUF may be designed such that the distance between the touch sensor metal and the second electrode E2 of the light emitting element ED is maintained to be a selected distance (for example, 1 μm). Accordingly, it may be possible to reduce or prevent formation of parasitic capacitance between the touch sensor metal and the second electrode E2 of the light emitting element ED and, as such, to prevent degradation of touch sensitivity caused by the parasitic capacitance.

On the other hand, the touch sensor metal, which includes the touch electrodes X-TE and Y-TE and the touch electrode connection lines X-CL and Y-CL, may be disposed on the encapsulation layer ENCAP without interposition of the touch buffer layer T-BUF as described above.

In addition, the touch buffer layer T-BUF may prevent a chemical liquid (a developer, an etchant, or the like) used in a process of forming the touch sensor metal on the touch buffer layer T-BUF from penetrating the light emitting layer EL including an organic material. Accordingly, the touch buffer layer T-BUF may prevent damage to the light emitting layer EL weak against a chemical liquid or moisture.

The touch buffer layer T-BUF may be formed of an organic insulating material having a low dielectric constant and capable of being formed at a low temperature equal to or lower than a selected temperature (for example, 100° C.) in order to prevent damage to the light emitting layer EL including an organic material weak against a high temperature. For example, the touch buffer layer T-BUF may be formed of an acryl-based material, an epoxy-based material or a siloxane-base material. The touch buffer layer T-BUF, which has a planarization performance in accordance with use of an organic insulating material, may prevent damage to the inner layers PAS1, PCL and PAS2 constituting the encapsulation layer ENCAP and a breakage phenomenon of the touch sensor metal formed on the touch buffer layer T-BUF caused by bending of the organic light emitting display device.

In a mutual capacitance-based touch sensing structure, an X-touch electrode line X-TEL and a Y-touch electrode line Y-TEL may be disposed on the touch buffer layer T-BUF, and the X-touch electrode line X-TEL and the Y-touch electrode line Y-TEL may be disposed to intersect each other. The Y-touch electrode line Y-TEL may include a plurality of Y-touch electrode connection lines Y-CL electrically interconnecting a plurality of Y-touch electrodes Y-TE.

In this case, the plurality of Y-touch electrodes Y-TE and the plurality of Y-touch electrode connection lines Y-CL may be disposed on different layers, respectively, under the condition that an interlayer dielectric material ILD is interposed therebetween.

The plurality of Y-touch electrodes Y-TE may be spaced apart from one another by a uniform distance in a y-axis direction. The plurality of Y-touch electrodes Y-TE may be electrically connected to another Y-touch electrode Y-TE adjacent thereto in the y-axis direction via a Y-touch electrode connection line Y-CL.

The Y-touch electrode connection line Y-CL may be formed on the touch buffer layer T-BUF while being exposed through touch contact holes extending through the interlayer dielectric material ILD and, as such, may be electrically connected to two Y-touch electrodes Y-TE, which are adjacent to each other in the y-axis direction.

The Y-touch electrode connection line Y-CL may be disposed to overlap with the bank BANK. Accordingly, a decrease in aperture ratio caused by the Y-touch electrode connection line Y-CL may be prevented.

The X-touch electrode line X-TEL may include a plurality of X-touch electrode connection lines X-CL electrically interconnecting a plurality of X-touch electrodes X-TE. The plurality of X-touch electrodes X-TE and the plurality of X-touch electrode connection lines X-CL may be disposed on different layers, respectively, under the condition that the interlayer dielectric material ILD is interposed therebetween.

The plurality of X-touch electrodes X-TE may be spaced apart from one another by a uniform distance in an x-axis direction. Each of the plurality of X-touch electrodes X-TE may be electrically connected to another X-touch electrode X-TE adjacent thereto in the x-axis direction via an X-touch electrode connection line X-CL.

Alternatively, the X-touch electrode connection line X-CL may be disposed on the same plane as the X-touch electrodes X-TE and, as such, may be electrically connected to two X-touch electrodes X-TE adjacent in the x-axis direction without a separate contact hole, or may be integrated with the two X-touch electrodes X-TE adjacent in the x-axis direction.

The X-touch electrode connection line X-CL may be disposed to overlap with the bank BANK. Accordingly, a decrease in aperture ratio caused by the X-touch electrode connection line X-CL may be prevented.

Meanwhile, the Y-touch electrode line Y-TEL may be electrically connected to a touch driving circuit 150 via a Y-touch line Y-TL and a Y-touch pad Y-TP. Similarly, the X-touch electrode line X-TEL may be electrically connected to the touch driving circuit 150 via an X-touch line X-TL and an X-touch pad X-TP.

In this case, a pad cover electrode covering the X-touch pad X-TP and the Y-touch pad Y-TP may further be disposed.

The X-touch pad X-TP may be formed separately from the X-touch line X-TL, or may be formed through extension of the X-touch line X-TL. The Y-touch pad Y-TP may be formed separately from the Y-touch line Y-TL, or may be formed through extension of the Y-touch line Y-TL.

When the X-touch pad X-TP is formed to extend from the X-touch line X-TL, and the Y-touch pad Y-TP is formed to extend from the Y-touch line Y-TL, all of the X-touch pad X-TP, the X-touch line X-TL, the Y-touch pad Y-TP and the Y-touch line Y-TL may be constituted by a first conductive material. Here, the first conductive material may be formed to have a single-layer structure or a multilayer structure using, for example, a metal having strong corrosion resistance, strong acid resistance and excellent conductivity, such as Al, Ti, Cu, or Mo.

For example, the X-touch pad X-TP, the X-touch line X-TL, the Y-touch pad Y-TP and the Y-touch line Y-TL may be formed to have a stacked triple-layer structure of, for example, Ti/Al/Ti or Mo/Al/Mo.

The pad cover electrode, which may cover the X-touch pad X-TP and the Y-touch pad Y-TP, may be constituted by a second conductive material identical to the material of the X and Y-touch electrodes X-TE and Y-TE. Here, the second conductive material may be a transparent conductive material having strong corrosion resistance and strong acid resistance, such as indium tin oxide (ITO) or indium zinc oxide (IZO). The pad cover electrode as described above may be formed to be exposed by the touch buffer layer T-BUF and, as such, may be bonded to the touch driving circuit 150 or to a circuit film on which the touch driving circuit 150 is mounted.

In this case, the touch buffer layer T-BUF may be formed to cover the touch sensor metal, thereby prevent the touch sensor metal from being eroded by ambient moisture or the like. For example, the touch buffer layer T-BUF may be formed of an organic insulating material or may be formed in the form of a circular polarization plate or a film made of an epoxy or acryl material. The touch buffer layer T-BUF may not be present on the encapsulation layer ENCAP. That is, the touch buffer layer T-BUF may not be an essential constituent element.

The Y-touch line Y-TL may be electrically connected to the Y-touch electrode Y-TE via a touch contact hole or may be integrated with the Y-touch electrode Y-TE.

The Y-touch line Y-TL as described above may extend to the non-display area and, as such, may be electrically connected to the Y-touch pad Y-TP while extending beyond an upper portion and a side surface of the encapsulation layer ENCAP and an upper portion and a side surface of the dam DAM. Accordingly, the Y-touch line Y-TL may be electrically connected to the touch driving circuit 150 via the Y-touch pad Y-TP.

The Y-touch line Y-TL may transmit the touch sensing signal TSS from the Y-touch electrode Y-TE to the touch driving circuit 150, or may receive the touch driving signal TDS from the touch driving circuit 150 and may transmit the received touch driving signal to the Y-touch electrode Y-TE.

In this case, a Y-touch bridge line Y-BL may be disposed under the Y-touch line Y-TL in a notch area NT and the bending area BD such that the Y-touch bridge line Y-BL is connected to the Y-touch line Y-TL via a contact hole CH. Since the Y-touch line Y-TL and the Y-touch bridge line Y-BL are electrically interconnected via one or more contact holes CH formed to be spaced apart from one another by a uniform distance, the same touch driving signal TDS or the same touch sensing signal TSS may be transmitted thereto.

When the Y-touch line Y-TL and the Y-touch bridge line Y-BL are electrically interconnected, as described above, it may be possible to reduce electrical resistance in a procedure of transmitting a touch driving signal TDS or a touch sensing signal TSS. In addition, when the Y-touch line Y-TL and the Y-touch bridge line Y-BL are interconnected via a plurality of contact holes CH, a touch signal (a touch driving signal TDS or a touch sensing signal TSS) may be bypassed via a contact hole CH even when disconnection occurs at a portion of the Y-touch line Y-TL or the Y-touch bridge line Y-BL and, as such, a desired touch sensing performance may be secured.

The Y-touch line Y-TL and the Y-touch bridge line Y-BL may be insulated at portions thereof other than the contact hole CH by the interlayer dielectric material ILD disposed therebetween.

Meanwhile, a plurality of Y-touch lines Y-TL1, Y-TL2, Y-TL3 and Y-TL4 may be disposed in a bezel area BZ, and a Y-touch bridge electrode Y-BE having an integrated structure may be disposed thereunder.

The Y-touch bridge electrode Y-BE, which has an integrated structure, may be formed to have a width equal to or greater than that of the Y-touch lines Y-TL1, Y-TL2, Y-TL3 and Y-TL4 disposed thereover, in order to cover the area occupied by the Y-touch lines Y-TL1, Y-TL2, Y-TL3 and Y-TL4.

In this case, the Y-touch bridge electrode Y-BE is connected to a ground voltage GND in order to discharge a noise charge entering the display panel 110, and is isolated from the Y-touch bridge line Y-BL disposed in the bending area BD.

As such, a noise charge entering the display panel 110 may be easily discharged to a terminal for the ground voltage GND by the Y-touch bridge electrode Y-BE formed to have an integrated structure so as to cover the area occupied by the Y-touch lines Y-TL1, Y-TL2, Y-TL3 and Y-TL4. Accordingly, it may be possible to enhance the touch sensing performance of the touch display device 100 and to reduce failure occurring during driving of the touch display device 100.

Meanwhile, the X-touch line X-TL may be electrically connected to the X-touch electrode X-TE via a touch contact hole or may be integrated with the X-touch electrode X-TE.

The X-touch line X-TL as described above may extend to the non-display area and, as such, may be electrically connected to the X-touch pad X-TP while extending beyond the upper portion and the side surface of the encapsulation layer ENCAP and the upper portion and the side surface of the dam DAM. Accordingly, the X-touch line X-TL may be electrically connected to the touch driving circuit 150 via the X-touch pad X-TP.

The X-touch line X-TL may receive a touch driving signal from the touch driving circuit 150 and may transmit the received touch driving signal to the X-touch electrode X-TE, or may transmit a touch sensing signal from the X-touch electrode X-TE to the touch driving circuit 150.

Disposition of the X-touch line X-TL and the Y-touch line Y-TL may be diversely varied in accordance with a design factor of the display panel 110.

Meanwhile, a touch protective layer PAC may be disposed over the X-touch electrode X-TE and the Y-touch electrode Y-TE. The touch protective layer PAC may extend to a front portion or a back portion of the dam DAM and, as such, may be disposed even on the X-touch line X-TL and the Y-touch line Y-TL.

Meanwhile, the cross-sectional view shown in FIG. 4 conceptually shows the structure of the touch display device 100. Positions, thicknesses or widths of respective patterns (various layers or various electrodes) may be varied in accordance with a viewing direction or position, connection structures of various patterns may be varied, an additional layer may further be present in addition to the shown several layers, and a part of the shown several layers may be omitted or integrated. For example, the width of the bank BANK may be smaller than the width shown in FIG. 4, and the height of the dam DAM may be smaller or greater than the height shown in FIG. 4.

The touch display device 100 may be used in a mobile appliance such as a smartphone or a tablet PC, and may also be used in a large-screen display device such as a display for an automobile, a display for exhibition or the like.

However, when the number of touch lines TL connected to the touch electrode TE is increased in order to enhance the touch sensing performance of the touch display device 100, the area of the touch electrode TE is relatively reduced and, as such, there is a problem in that the touch sensing performance is degraded.

In addition, as the length of the touch line TL increases, the parasitic capacitance caused by coupling between the touch line TL and the touch electrode TE may be increased and, as such, there is a problem in that touch sensitivity and accuracy of touch sensing may be degraded.

In particular, since a display device for a vehicle (e.g., automobile) generally has a larger screen compared to a mobile device, an area or number of the touch electrodes TE and the touch lines TL in the touch display device 100 may be increased. In a case of a large screen as described above, a load for transmitting a touch signal also increases, and the touch sensing performance may be deteriorated.

In addition, a display device for a vehicle such as an instrument panel or a dashboard has a long length according to an X-direction and a short length according to a Y-direction, thus a width of the display device for the vehicle may be different from a height, unlike a mobile device. In the display device for the vehicle that is configured with a larger screen than a mobile device and to have a long width and a short height, the configuration of the present disclosure may be beneficial to maintain a touch sensing performance at a same level as that of the mobile device or to further improve the touch sensing performance.

In other words, a display device generally used in an automobile tends to have a width that is relatively greater than a height (e.g., a landscape orientation) and is fixed to the automobile (usually adjacent to the instrument panel of the automobile), whereas a mobile device tends to have a height that is relatively greater than a width to fit a user's hand (e.g., a portrait orientation; although the user is not limited in any way and may freely rotate the mobile device to view it in a landscape orientation). Due to this configuration differences, it is beneficial for the touch configuration of a display panel used in the automobile to have a different touch configuration of a display panel of a mobile device.

A touch display device 100 according to an example embodiment of the disclosure may apply a multi-feeding structure in which touch lines TL are alternately arranged. In this case, it may be possible to reduce the number of the touch lines TL, and a desired area of the touch electrode TE may be secured. Accordingly, an enhancement in touch sensing performance may be achieved.

Figure 5:
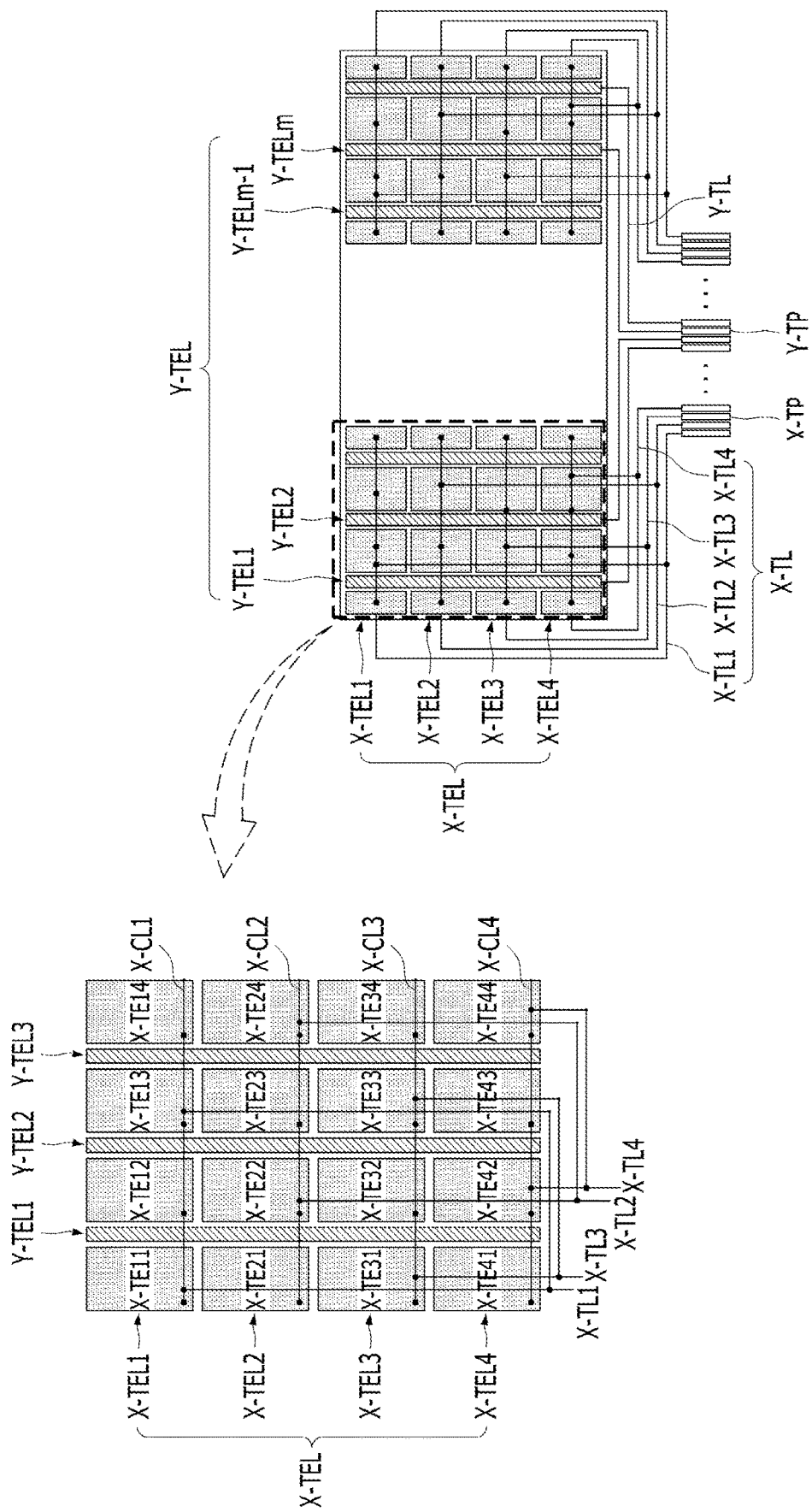
FIG. 5 is a view illustratively showing a display panel having a multi-feeding structure, in which a touch signal is simultaneously applied to a plurality of touch electrodes disposed on the same line, in a touch display device according to an example embodiment of the disclosure.

FIG. 5 is a view illustratively showing a display panel having a multi-feeding structure, in which a touch signal is simultaneously applied to a plurality of touch electrodes disposed on the same line, in a touch display device according to an example embodiment of the disclosure.

Referring to FIG. 5, in a touch display device 100 according to an example embodiment of the disclosure, a touch line may be configured to have a multi-feeding structure such that a touch signal is simultaneously applied to a plurality of touch electrodes constituting the same touch electrode line TEL, for reduction of temporal delay of the touch signal.

In this case, when a plurality of X-touch electrodes arranged in an x-axis direction constitute one X-touch electrode line X-TEL, the plurality of X-touch electrodes constituting one X-touch electrode line X-TEL may be interconnected by an X-touch electrode connection line X-CL, and a plurality of X-touch electrodes disposed on the same line may be interconnected by the same X-touch line X-TL, in order to enable a touch signal to be simultaneously applied to the plurality of X-touch electrodes constituting one X-touch electrode line X-TEL.

Alternatively, when a plurality of Y-touch electrodes arranged in a y-axis direction constitute one Y-touch electrode line Y-TEL, a plurality of Y-touch electrodes disposed on the same line may be interconnected by the same Y-touch line Y-TL, in order to enable a touch signal to be simultaneously applied to the plurality of Y-touch electrodes constituting one Y-touch electrode line Y-TEL.

Here, the case in which each x-axis directional X-touch electrode line X-TEL is constituted by a plurality of X-touch electrodes, and each y-axis directional Y-touch electrode line Y-TEL is constituted by one Y-touch electrode is illustratively shown. In this case, accordingly, a plurality of X-touch electrodes arranged in the same row in the x-axis direction may be interconnected by the same X-touch line X-TL.

For example, a first-row X-touch electrode line X-TEL1 is constituted by a plurality of X-touch electrodes disposed in a first row, and the plurality of X-touch electrodes disposed in the first row is electrically connected to a first X-touch line X-TL1 having a branched structure and, as such, a first touch signal may be simultaneously transmitted to the plurality of X-touch electrodes.

As a touch signal is simultaneously applied to a plurality of X-touch electrodes disposed in the x-axis direction, as described above, delay of the touch signal for the plurality of X-touch electrodes may be reduced and, as such, the touch performance of the entire screen of the display panel 110 may be uniformized.

For example, when each of the plurality of X-touch electrodes disposed in the x-axis direction is a touch driving electrode, the plurality of X-touch electrodes constituting one X-touch electrode line X-TEL may be electrically interconnected by the same X-touch line X-TL and, as such, the same touch driving signal TDS may be applied to the plurality of X-touch electrodes at the same timing.

A plurality of X-touch electrode lines X-TEL1, . . . , and X-TELn may be electrically connected to corresponding ones of X-touch pads X-TP via X-touch lines X-TL1, . . . , and X-TLn, respectively. For example, a plurality of X-touch electrodes included in a first X-touch electrode line X-TEL1 may be electrically connected to the corresponding X-touch pad X-TP via a first X-touch line X-TL1.

On the other hand, since Y-touch electrode lines Y-TEL1, . . . , and Y-TELm are each constituted by one Y-touch electrode, each of the Y-touch electrode lines Y-TEL1, . . . , and Y-TELm may be electrically connected to a corresponding Y-touch pad Y-TP via one Y-touch line Y-TL.

In this case, the structure in which one touch line is branched in order to connect the touch line to a plurality of touch electrodes constituting the same touch electrode line TEL may be diversely varied.

Meanwhile, the X-touch line X-TL connected to the X-touch electrodes X-TE disposed in each row may be alternately arranged in plural.

Referring to FIG. 5, in the touch display device 100 according to the example embodiment of the disclosure, X-touch lines X-TL or Y-touch lines Y-TL are alternately arranged and, as such, it may be possible to reduce the number of touch lines TL and to secure a desired area of a touch electrode TE.

The following description will be given in conjunction with, for example, a mutual capacitance-based touch sensing structure in which touch electrodes TE11 to TE44 are arranged in a 4×4 matrix.

In the mutual capacitance-based touch sensing structure, X-touch electrode lines X-TEL and Y-touch electrode lines Y-TEL may be disposed to overlap each other.

For example, a first X-touch electrode line X-TEL1 may be constituted by a first-row first-column X-touch electrode X-TE11, a first-row second-column X-touch electrode X-TE12, a first-row third-column X-touch electrode X-TE13, and a first-row fourth-column X-touch electrode X-TE14.

In this case, X-touch electrodes X-TE11, X-TE12, X-TE13 and X-TE14 disposed in the first row may be interconnected in the x-axis direction by a first X-touch electrode connection line X-CL1. Accordingly, a touch signal transmitted through a part of the X-touch electrodes X-TE11, X-TE12, X-TE13 and X-TE14 disposed in the first row may be transmitted to all of the X-touch electrodes X-TE11, X-TE12, X-TE13 and X-TE14 disposed in the first row by the first X-touch electrode connection line X-CL1.

In addition, X-touch electrodes X-TE21, X-TE22, X-TE23 and X-TE24 disposed in the second row may be interconnected in the x-axis direction by a second X-touch electrode connection line X-CL2. Accordingly, a touch signal transmitted through a part of the X-touch electrodes X-TE21, X-TE22, X-TE23 and X-TE24 disposed in the second row may be transmitted to all of the X-touch electrodes X-TE21, X-TE22, X-TE23 and X-TE24 disposed in the second row by the second X-touch electrode connection line X-CL2.

In this case, X-touch lines X-TL1, X-TL2, X-TL3, and X-TL4 extending in a y-axis direction may be alternately arranged and, as such, may be connected to the X-touch electrodes X-TE11 to X-TE44.

For example, among the X-touch electrodes X-TE11, X-TE21, X-TE31 and XTE41 disposed in the first column, the first-row first-column X-touch electrode X-TE11 is connected to the first X-touch line X-TL1, and the third-row first-column X-touch electrode X-TE31 is connected to the third X-touch line X-TL3.

On the other hand, the second-row first-column X-touch electrode X-TE21 and the fourth-row first-column X-touch electrode X-TE41 are not directly connected to any X-touch line X-TL.

However, since the first-row X-touch electrodes X-TE11, X-TE12, X-TE13 and XTE14 are connected in the x-axis direction by the first-row X-touch electrode connection line X-CL1, a touch signal transmitted via the first X-touch line X-TL1 may be transmitted to all of the first-row X-touch electrodes X-TE11, X-TE12, X-TE13 and XTE14.

Similarly, the third-row X-touch electrodes X-TE31, X-TE32, X-TE33 and XTE34 are connected in the x-axis direction by the third-row X-touch electrode connection line X-CL3 and, as such, a touch signal transmitted via the third X-touch line X-TL3 may be transmitted to all of the third-row X-touch electrodes X-TE31, X-TE32, X-TE33 and XTE34.

Thus, it may be possible to transmit a touch signal by disposing only two X-touch lines X-TL1 and X-TL3 in an area where the four X-touch electrodes X-TE11, X-TE21, X-TE31 and XTE41 in the first column are disposed and, as such, to reduce the number of touch lines TL.

In this case, among the X-touch electrodes X-TE12, X-TE22, X-TE32 and XTE42 disposed in the second column, the second-row second-column X-touch electrode X-TE22 is connected to the second X-touch line X-TL2, and the fourth-row second-column X-touch electrode X-TE42 is connected to the fourth X-touch line X-TL4. On the other hand, the first-row second-column X-touch electrode X-TE12 and the third-row second-column X-touch electrode X-TE32 are not directly connected to any X-touch line X-TL.

Accordingly, connection points of the X-touch lines X-TL1 and X-TL3 connected to the first column X-touch electrodes corresponding to a left area with reference to the first Y-touch electrode line Y-TEL1 may be disposed to be not aligned with (or misaligned from) connection points of the X-touch lines X-TL2 and X-TL4 connected to the second column X-touch electrodes corresponding to a right area with reference to the first Y-touch electrode line Y-TEL1.

As a result, it may be possible to transmit a touch signal by disposing only two X-touch lines X-TL2 and X-TL4 in an area where the four X-touch electrodes X-TE12, X-TE22, X-TE32 and XTE42 in the second column are disposed and, as such, to reduce the number of touch lines TL.

Meanwhile, for X-touch electrodes X-TE13, X-TE23, X-TE33 and X-TE43 disposed in the third column, X-touch lines X-TL may be connected thereto in the same manner as the first column. That is, the first-row third-column X-touch electrode X-TE13 is connected to the first X-touch line X-TL1, and the third-row third-column X-touch electrode X-TE33 is connected to the third X-touch line X-TL3. On the other hand, the second-row third-column X-touch electrode X-TE23 and the fourth-row third-column X-touch electrode X-TE43 are not directly connected to any X-touch line X-TL.

Similarly, for X-touch electrodes X-TE14, X-TE24, X-TE34 and X-TE44 disposed in the fourth column, X-touch lines X-TL may be connected thereto in the same manner as the second column. That is, the second-row fourth-column X-touch electrode X-TE24 is connected to the second X-touch line X-TL2, and the fourth-row fourth-column X-touch electrode X-TE44 is connected to the fourth X-touch line X-TL4. On the other hand, the first-row fourth-column X-touch electrode X-TE14 and the third-row fourth-column X-touch electrode X-TE34 are not directly connected to any X-touch line X-TL.

Thus, it may be possible to reduce the number of touch lines TL and to secure a desired area of the touch electrode TE through a multi-feeding structure in which the touch lines TL are alternately arranged, and a touch signal is simultaneously applied to X-touch electrodes X-TE disposed in the same row. As a result, an enhancement in touch sensing performance may be achieved.

Although the multi-feeding structure, in which touch lines TL are alternately arranged on a two-line basis, and a touch signal is simultaneously applied to X-touch electrodes X-TE disposed in the same row, has been illustratively described in the above description, it may be possible to implement a multi-feeding structure in which touch lines TL are alternately arranged on an N-line basis (N being a natural number equal to or greater than 2), and a touch signal is simultaneously applied to X-touch electrodes X-TE disposed in the same row.

Meanwhile, in the touch display device 100 according to the example embodiment of the disclosure, the X-touch electrodes X-TE may have the same shape. However, a part of the X-touch electrodes X-TE may have a shape different from that of the remaining part of the X-touch electrodes X-TE.

Figure 6A:
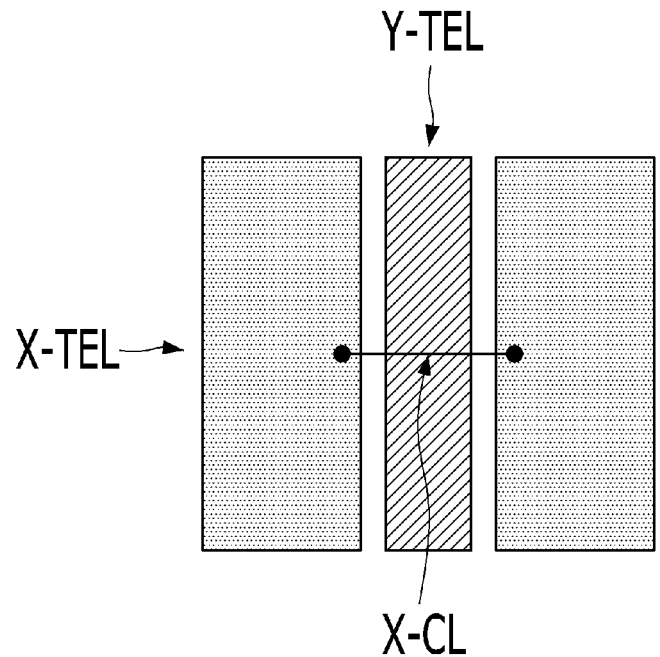
FIGS. 6A and 6B are views illustratively showing various structures of a touch electrode line in a touch display device according to an example embodiment of the disclosure.
Figure 6B:
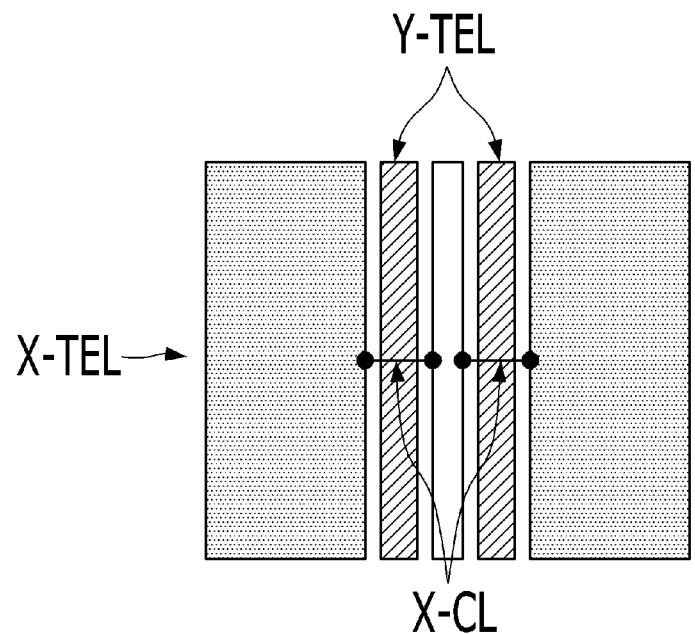

FIGS. 6A and 6B are views illustratively showing various structures of a touch electrode line in a touch display device according to an example embodiment of the disclosure.

Referring to FIGS. 6A and 6B, a touch display device 100 according to an example embodiment of the disclosure may be constituted by touch electrode lines X-TEL and Y-TEL having various structures.

For example, in the touch display device 100 according to the example embodiment of the disclosure, as shown in FIG. 6A, an X-touch electrode line X-TEL may be constituted by X-touch electrodes X-TE having the same shape while being disposed at opposite sides in an x-axis direction with reference to a Y-touch electrode line Y-TEL having a single bar structure extending in a y-axis direction.

Alternatively, as shown in FIG. 6B, a Y-touch electrode line Y-TEL constituted by two bars, under the condition that an X-touch electrode having a thin structure is interposed between the two bars, may be formed to have a split structure, and an X-touch electrode line X-TEL may be constituted by X-touch electrodes X-TE having the same shape while being disposed at opposite sides in the x-axis direction with reference to the Y-touch electrode line Y-TEL constituted by the double-bar structure, and an X-touch electrode X-TE having a thin structure while being interposed between the two bars of the Y-touch electrode line Y-TEL.

In either case, portions of the X-touch electrode line X-TEL separated by the Y-touch electrode line Y-TEL may be interconnected via an X-touch electrode connection line X-CL.

Meanwhile, the area of the X-touch electrode line X-TEL, to which a touch driving signal is applied, and the area of the Y-touch electrode line Y-TEL, to which a touch sensing signal is transmitted, may be equal to or different from each other.

For example, when it is desired to relatively reduce parasitic capacitance caused by the Y-touch electrode line Y-TEL, to which a touch sensing signal is transmitted, the Y-touch electrode line Y-TEL may be formed to have a smaller area than the X-touch electrode line X-TEL. In this case, the area of the X-touch electrode line X-TEL, to which a touch driving signal is applied, and the area of the Y-touch electrode line Y-TEL, to which a touch sensing signal is transmitted, may be determined to have a ratio of 5:1 to 2:1. For example, the area of the X-touch electrode line X-TEL and the area of the Y-touch electrode line Y-TEL may be determined to have a ratio of 4:1.

Structures of the touch electrode lines X-TEL and Y-TEL as described above may be diversely varied in accordance with the size or application of the touch display device 100.

Meanwhile, an X-touch line X-TL electrically connected to the X-touch electrode line X-TEL may be formed at a position spaced apart from the Y-touch electrode line Y-TEL by a selected distance.

Figure 7:
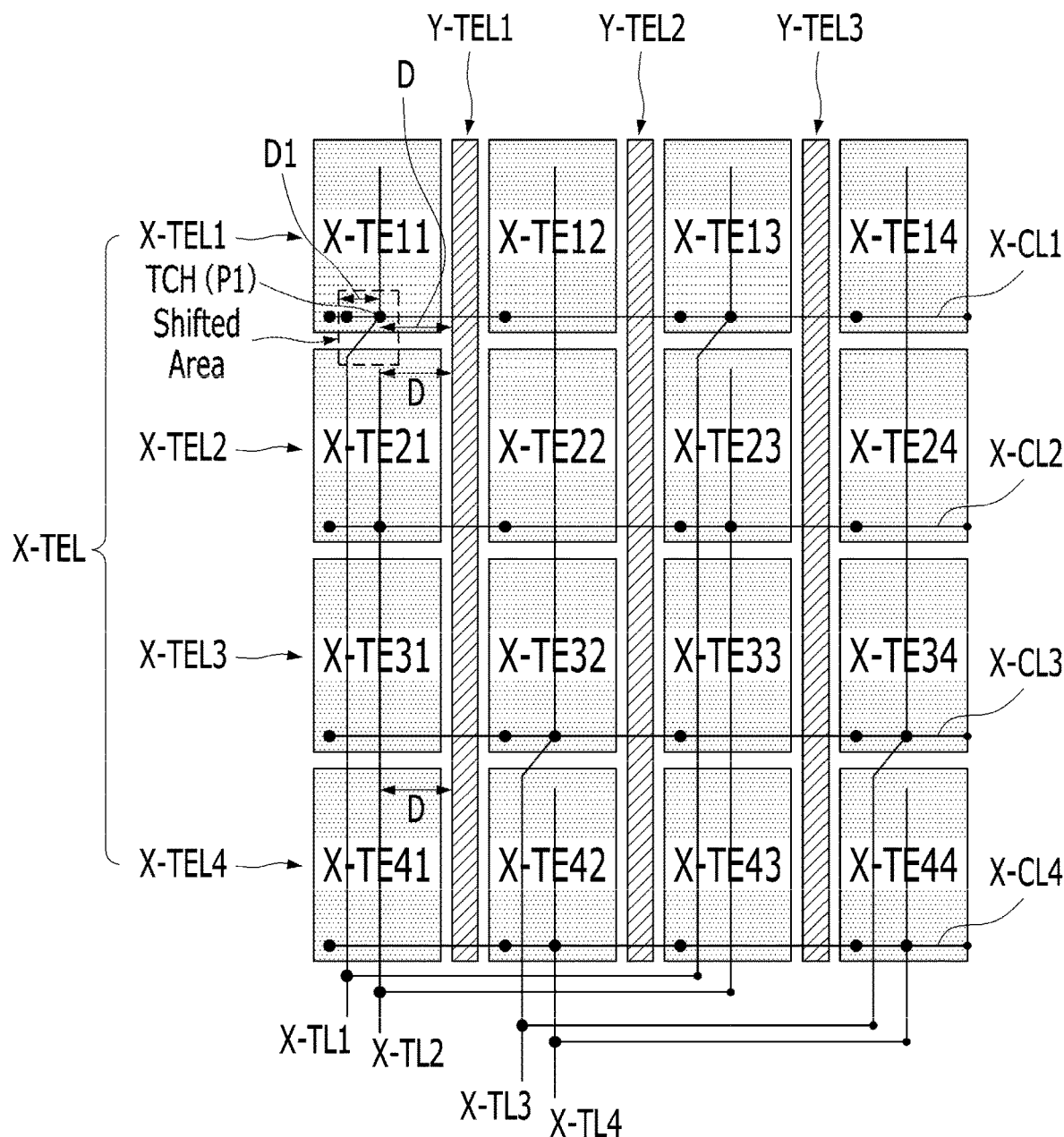
FIG. 7 is a view illustratively showing a distance between a touch line, to which a touch driving signal is applied, and a touch sensing electrode line, to which a touch sensing signal is transmitted, in a touch display device.

FIG. 7 is a view illustratively showing a distance between a touch line, to which a touch driving signal is applied, and a touch sensing electrode line, to which a touch sensing signal is transmitted, in a touch display device.

FIG. 7 shows the case in which each of x-axis directional X-touch electrode lines X-TEL1, X-TEL2, X-TEL3 and X-TEL4 are constituted by a plurality of X-touch electrodes X-TE each corresponding to a touch driving electrode, and each of y-axis directional Y-touch electrode lines Y-TEL1, Y-TEL2 and Y-TEL3 is constituted by one Y-touch electrode Y-TE corresponding to a touch sensing electrode.

In this case, a touch driving signal is applied to the first X-touch electrode line X-TEL1 disposed in a first row via a first X-touch line X-TL1, and a touch driving signal is applied to the second X-touch electrode line X-TEL2 disposed in a second row via a second X-touch line X-TL2.

When each X-touch line X-TL is linearly formed in this structure, a distance D between the y-touch electrode line Y-TEL corresponding to a touch sensing electrode and the X-touch line X-TL may be varied in accordance with a position of the X-touch electrode line X-TEL due to a position of a contact hole to which the X-touch line X-TL and the X-touch electrode line X-TEL are connected.

As a result, even when touch is generated at an X-touch electrode X-TE of a particular position, parasitic capacitance may be generated due to another X-touch line X-TL passing by the particular X-touch electrode X-TE, and a parasitic capacitance deviation may be generated due to a distance difference of the X-touch lines X-TL from the Y-touch electrode line Y-TEL. As such, touch performance may be degraded.

In particular, such a phenomenon may be further greatly exhibited in a multi-touch case in which a plurality of fingers simultaneously touches a plurality of X-touch electrodes.

In particular, since a greater number of X-touch lines X-TL may be arranged at a position nearer to a touch driving circuit 150, parasitic capacitance formed between the X-touch line X-TL and the Y-touch electrode line Y-TEL may further increase at a position nearer to the touch driving circuit 150 in this case.

As a result, when touch lines TL are formed to have a multi-feeding structure in order to simultaneously apply a touch driving signal to a plurality of touch driving electrodes constituting an X-touch electrode line X-TEL, there may be degradation in touch performance and difficulty in discriminating a correct touch position due to parasitic capacitance formed between an X-touch line X-TL and a Y-touch electrode line Y-TEL.

In order to solve this problem, the Y-touch electrode line Y-TEL corresponding to a touch sensing electrode and the X-touch line X-TL corresponding to a touch driving line may be formed such that the distance D therebetween is uniform, for a reduction in deviation of the parasitic capacitance formed between the X-touch line X-TL and the Y-touch electrode line Y-TEL.

To this end, the X-touch line X-TL extending in the y-axis direction may be formed to have a structure in which the X-touch line X-TL is shifted toward the Y-touch electrode line Y-TEL through a shifted area.

Referring to FIG. 7, in the display device 100 according to the example embodiment of the disclosure, a display panel 110 may include an X-touch electrode line X-TEL constituted by a plurality of X-touch electrodes X-TE arranged in the x-axis direction and configured to simultaneously apply a touch driving signal to the plurality of X-touch electrodes, Y-touch electrode lines Y-TEL extending in the y-axis direction while being configured to receive a touch sensing signal, and a plurality of X-touch lines X-TL each extending in the y-axis direction while being electrically connected to a designated one of the X-touch electrodes X-TE via a touch contact hole TCH and configured to transmit the touch driving signal to the designated X-touch electrode X-TE. The plurality of X-touch lines X-TL may be disposed such that a distance D between the touch contact hole electrically connecting the X-touch line X-TL to the designated X-touch electrode X-TE and the Y-touch electrode line Y-TEL adjacent to the touch contact hole TCH is uniform.

For example, a second X-touch line X-TL2 nearest to a left side of a first Y-touch electrode line Y-TEL1 from among the plurality of X-touch lines X-TL may be electrically connected to a second X-touch electrode line X-TEL2 via a touch contact hole TCH at a position spaced apart from the first Y-touch electrode line Y-TEL1 by a selected distance D. Accordingly, the distance between the second X-touch line X-TL2 connected to the second X-touch electrode line X-TEL2 and the first Y-touch electrode line Y-TEL1 may be D.

The second X-touch line X-TL2 may extend only to a touch contact hole TCH electrically connecting the second X-touch electrode line X-TEL2 to the second X-touch electrode line X-TEL2.

On the other hand, a first X-touch line X-TL1 is formed to be shifted toward the first Y-touch electrode line Y-TEL1 by a selected distance in a shifted area.

In this case, the shifting distance of the first X-touch line X-TL1 in the shifted area may correspond to the distance between the first X-touch line X-TL1 and the second X-touch line X-TL2. Accordingly, the position of the first X-touch line X-TL1 shifted in the shifted area corresponds to a point of the first X-touch line X-TL1 spaced apart from the first Y-touch electrode line Y-TEL1 by the distance D. As a result, a point where the first X-touch line X-TL1 is connected to the first X-touch electrode line X-TEL1 corresponds to the point of the first X-touch line X-TL1 spaced apart from the first Y-touch electrode line Y-TEL1 by the distance D, similarly to the case of the second X-touch line X-TL2.

Similarly, the first X-touch line X-TL1 may be disposed such that the first X-touch line X-TL1 extends only to a touch contact hole TCH electrically connected to the first X-touch electrode line X-TEL1 and, as such, the first X-touch line X-TL1 may extend only to a shifted area of the first X-touch electrode line X-TEL1.

Thus, the X-touch lines X-TL respectively connected to the X-touch electrode lines X-TEL may be sequentially shifted in respective shifted areas of the X-touch electrode lines X-TEL and, as such, may be arranged such that points of the X-touch lines X-TL electrically connected to the X-touch electrode lines X-TEL via touch contact holes TCH are spaced apart from corresponding ones of the Y-touch electrode lines Y-TEL by a uniform distance D, respectively.

In this case, the shifted area in which the X-touch line X-TL is formed to have a shifted structure may correspond to an edge area of the X-touch electrode line X-TEL, for uniform disposition of the X-touch line X-TL with respect to the Y-touch electrode line Y-TEL. For example, when the touch driving circuit 150 is disposed at a lower portion of the display panel 110, the X-touch line X-TL extends upwards from the lower portion of the display panel 110 and, as such, the shifted area in which the X-touch line X-TL is formed to have a shifted structure may correspond to a lower edge area of the X-touch electrode line X-TEL.

In addition, portions of the X-touch electrode line X-TEL disposed at opposite sides of the Y-touch electrode line Y-TEL may be interconnected via the X-touch electrode connection line X-CL. In this case, a point where the X-touch electrode line X-TEL is connected to the X-touch electrode connection line X-CL may correspond to a touch contact hole TCH where the X-touch line X-TL and the X-touch electrode line X-TEL are electrically interconnected. In this case, the X-touch electrode connection line X-CL, which interconnects the portions of the X-touch electrode line X-TEL disposed at opposite sides of the Y-touch electrode line Y-TEL, and the X-touch line X-TL electrically connected to the X-touch electrode line X-TEL may be interconnected by one touch contact hole TCH.

In addition, for uniform disposition of the X-touch line X-TL with respect to the Y-touch electrode line Y-TEL, it is beneficial that the X-touch line X-TL be formed symmetrically with the Y-touch electrode line Y-TEL with reference to the touch contact hole TCH interconnecting the X-touch electrode X-TE and the X-touch electrode connection line X-CL.

In this case, under the condition that the Y-touch electrode line Y-TEL corresponding to a touch sensing electrode and the X-touch line X-TL corresponding to a touch driving line are formed such that the distance D therebetween is uniform, a direction that the X-touch line X-TL is shifted in a shifted area may be a horizontal direction or may be a diagonal direction.

When X-touch lines X-TL each having a shifted area are alternately arranged, it may be possible to reduce the number of touch lines TL and to uniformly distribute a capacitance between Y-touch electrode lines Y-TEL and X-touch lines X_TL. Accordingly, an enhancement in touch sensing performance may be achieved.

In the above-description, the case of a touch electrode structure in a 4×4 matrix, that is, the case in which two X-touch lines X-TL are disposed at each of left and right sides of a Y-touch electrode line Y-TEL, has been illustratively described. However, when the number of touch electrodes increases, the number of X-touch lines X-TL disposed at each of the left and right sides of the Y-touch electrode line Y-TEL may be correspondingly increased.

Meanwhile, the touch electrode lines X-TEL and Y-TEL included in the touch display device 100 may be constituted by a plate type touch electrode metal having no opening or a mesh type touch electrode metal having an opening for desired luminous efficacy of sub-pixels SP.

Figure 8:
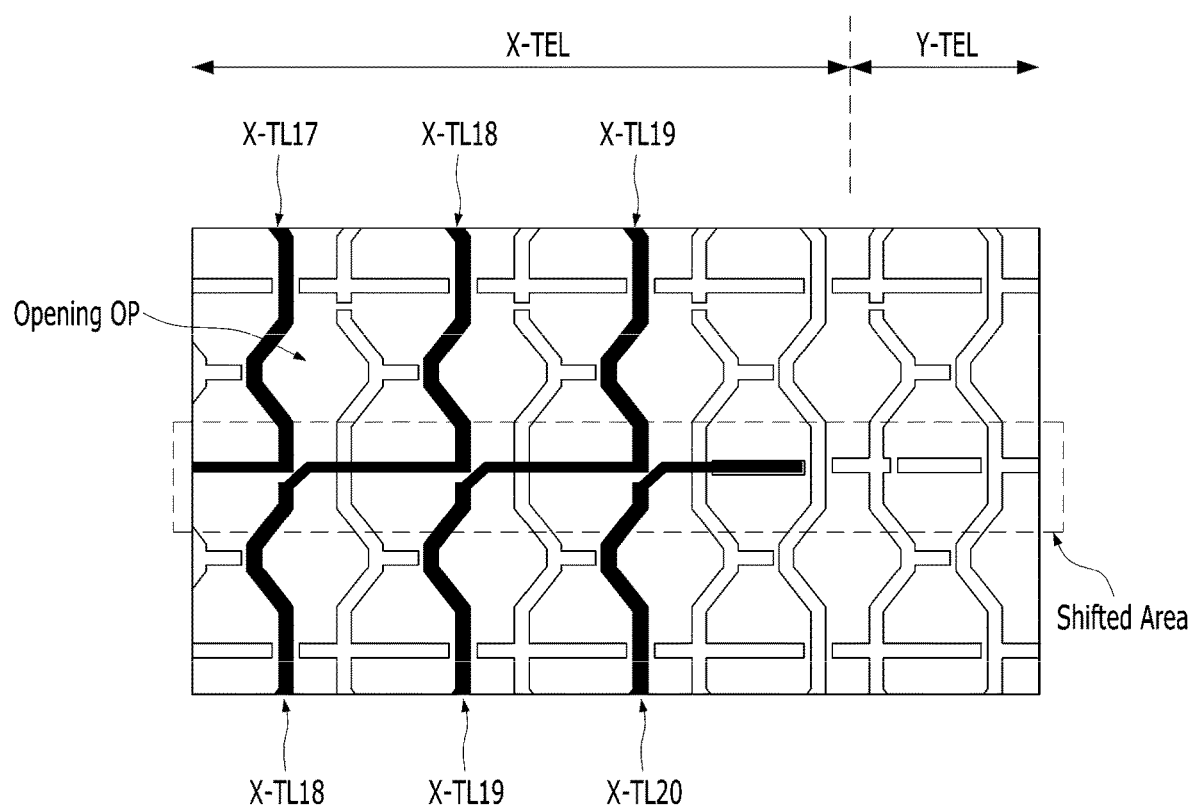
FIG. 8 is a view illustratively showing a touch line in a shifted area in the case in which a touch electrode line is constituted by a mesh type touch electrode metal in a touch display device according to an example embodiment of the disclosure.

FIG. 8 is a view illustratively showing a touch line in a shifted area in the case in which a touch electrode line is constituted by a mesh type touch electrode metal in a touch display device according to an example embodiment of the disclosure.

Referring to FIG. 8, in a touch display device 100 according to an example embodiment of the disclosure, an X-touch electrode line X-TEL, to which a touch driving signal is applied, and a Y-touch electrode line Y-TEL, to which a touch sensing signal is transmitted, may be constituted by a mesh type touch electrode metal having an opening.

In this case, each of the touch electrode lines X-TEL and Y-TEL may extend to have repeated structures each having an opening at a central portion thereof and a touch electrode metal surrounding the opening. Here, the case in which the touch electrode metal surrounding the opening has an octagonal shape is illustratively shown.

X-touch lines X-TL, which apply a touch driving signal, may extend along an octagonal touch electrode metal constituting an X-touch electrode line X-TEL, and a designated one of the X-touch lines X-TL may be electrically connected to an X-touch electrode line X-TEL corresponding thereto via a touch contact hole TCH at a position where the X-touch line X-TL is spaced apart from a Y-touch electrode line Y-TEL by a selected distance D.

Meanwhile, the touch electrode lines X-TEL and Y-TEL may be constituted by a transparent electrode or may include a transparent electrode, for desired luminous efficacy of sub-pixels SP.

The touch display device 100 may be applicable to a mobile appliance such as a smartphone or a tablet computer and a display for an automobile. In this case, the touch display device 100 may use an antenna in order to communicate with other appliances.

In this case, the touch display device 100, which uses the antenna, may exhibit degradation of transmission/reception performance for a radio signal and touch sensing performance due to electromagnetic interference thereof with a touch driving signal transmitted through a touch electrode line TEL in a procedure of transmitting and receiving a radio signal of a high-frequency band.

In order to solve this problem, in a touch display device 100 according to an example embodiment of the disclosure, a pseudo-touch electrode line capable of offsetting electromagnetic interference between a radio signal and a touch driving signal may be disposed in a non-display area.

Figure 9:
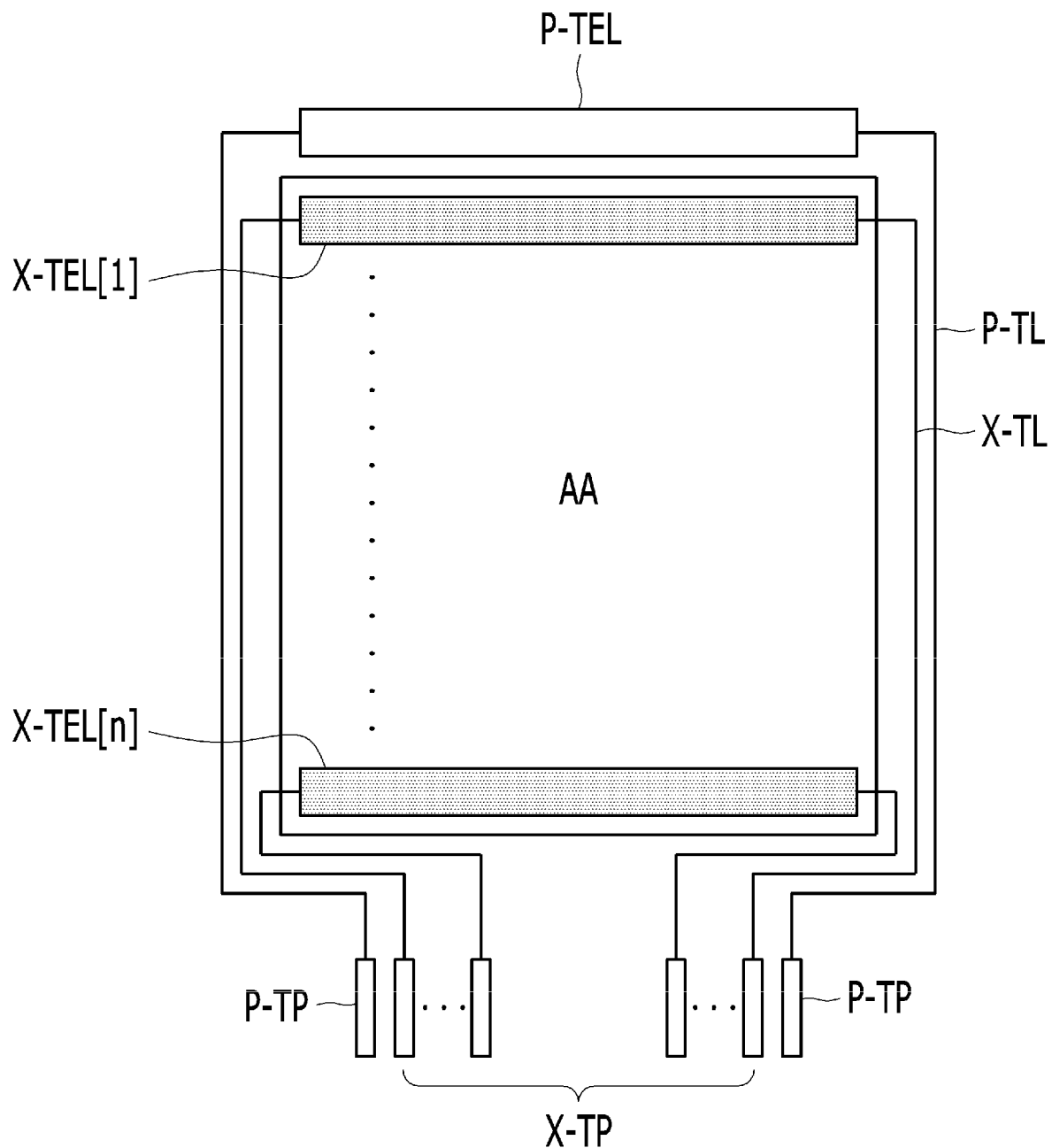
FIG. 9 is a view illustratively showing a structure in which a pseudo-touch electrode line is disposed in a touch display device according to an example embodiment of the disclosure.

FIG. 9 is a view illustratively showing a structure in which a pseudo-touch electrode line is disposed in a touch display device according to an example embodiment of the disclosure.

Referring to FIG. 9, a touch display device 100 according to an example embodiment of the disclosure may include a plurality of X-touch electrode lines X-TEL and a plurality of Y-touch electrode lines Y-TEL disposed in a display area AA of a display panel 110, and a pseudo-touch electrode line P-TEL disposed in a non-display area of the display panel 110.

For convenience of description, the case in which a touch driving signal is applied via n number (where n is a natural number) of X-touch electrode lines X-TEL[1] to X-TEL[n] disposed in the display area AA to extend in a first direction, and a pseudo-touch electrode line P-TEL is disposed in a direction parallel to the X-touch electrode lines X-TEL in the non-display area is illustratively shown.

Each of the n X-touch electrode lines X-TEL[1] to X-TEL[n] is electrically connected to an X-touch pad X-TP corresponding thereto via one X-touch routing line X-TL. That is, an X-touch electrode X-TE disposed at an outermost side from among a plurality of X-touch electrodes X-TE included in one X-touch electrode line X-TEL is electrically connected to an X-touch pad X-TP corresponding thereto via an X-touch routing line X-TL.

One or more pseudo-touch electrode lines P-TEL may be disposed in the non-display area in a direction parallel to the X-touch electrode lines X-TEL[1] to X-TEL[n], to which a touch driving signal is supplied. In this case, one pseudo-touch electrode line P-TEL is electrically connected to the pseudo-touch pad P-TP corresponding thereto via one pseudo-touch routing line P-TL.

A pseudo-touch driving signal, which is reverse in phase to a touch driving signal supplied through the plurality of X-touch electrode lines X-TEL[1] to X-TEL[n], may be applied to the pseudo-touch electrode line P-TEL disposed in the non-display area and, as such, electromagnetic interference caused by the touch driving signal may be offset.

Figure 10:
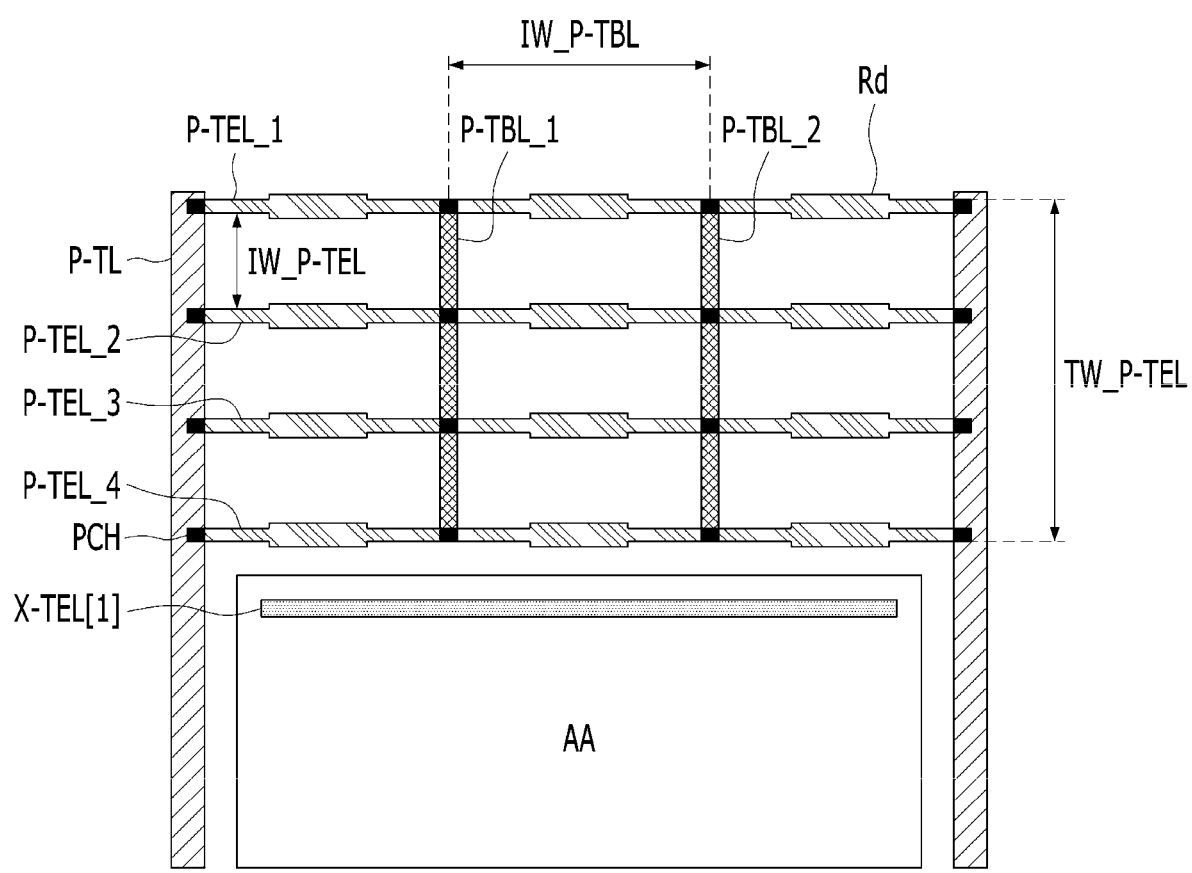
FIG. 10 is a view illustratively showing another example in which a plurality of pseudo-touch electrode lines is connected to one pseudo-touch routing line in a touch display device according to an example embodiment of the disclosure.

Alternatively, as shown in FIG. 10, a plurality of pseudo-touch electrode lines P-TEL_1 to P-TEL_4 extending from one pseudo-touch routing line P-TL may be interconnected by one or more pseudo-touch bridge lines P-TBL_1 and P-TBL_2.

The one or more pseudo-touch bridge lines P-TBL_1 and P-TBL_2 may maintain synchronism of pseudo-touch driving signals applied along a plurality of pseudo-touch electrode lines P-TEL_1 to P-TEL_4 or may prevent delay of the pseudo-touch driving signals. In addition, a spacing IW_P-TBL among a plurality of pseudo-touch bridge lines P-TBL_1 and P-TBL_2 may be adjusted and, as such, an effect of blocking a radio signal received through an antenna may be enhanced.

In this case, one pseudo-touch electrode line P-TEL may be connected to one pseudo-touch routing line P-TL, but a plurality of pseudo-touch electrode lines P-TEL spaced apart from one another by a selected distance may be connected to one pseudo-touch routing line P-TL and, as such, electromagnetic interference between a touch driving signal and a radio signal may be effectively reduced.

FIG. 10 is a view illustratively showing another example in which a plurality of pseudo-touch electrode lines is connected to one pseudo-touch routing line in a touch display device according to an example embodiment of the disclosure.

Referring to FIG. 10, in a touch display device 100 according to an example embodiment of the disclosure, a plurality of pseudo-touch electrode lines P-TEL_1 to P-TEL_4 extending in a direction parallel to a plurality of X-touch electrode lines X-TEL is connected to one pseudo-touch routing line P-TL while being spaced apart from one another by a selected distance, in order to reduce electromagnetic interference.

For example, a plurality of pseudo-touch electrode lines P-TEL_1 to P-TEL_4 extending from a pseudo-touch routing line P-TL extending in a y-axis direction along a side surface of a display area AA are disposed to be spaced apart from one another by a selected reference distance IW_P-TEL along a non-display area.

In this case, when the reference distance IW_P-TEL, by which the plurality of pseudo-touch electrode lines P-TEL_1 to P-TEL_4 are spaced apart from one another, is shorter than the wavelength of a radio signal, the radio signal received by the touch display device 100 via an antenna cannot pass through a space among the plurality of pseudo-touch electrode lines P-TEL_1 to P-TEL_4, the radiation efficiency of the plurality of pseudo-touch electrode lines P-TEL_1 to P-TEL_4 disposed to be spaced apart from one another by the reference distance IW_P-TEL is equal to that of one pseudo-touch electrode line P-TEL formed to have an integrated structure while having a width equal to a total distance TW_P-TEL of the plurality of pseudo-touch electrode lines P-TEL_1 to P-TEL_4.

Meanwhile, the plurality of pseudo-touch electrode lines P-TEL_1 to P-TEL_4 extending from one pseudo-touch routing line P-TL may be interconnected by one or more pseudo-touch bridge lines P-TBL_1 and P-TBL_2.

The one or more pseudo-touch bridge lines P-TBL_1 and P-TBL_2 may maintain synchronization of pseudo-touch driving signals applied along the plurality of pseudo-touch electrode lines P-TEL_1 to P-TEL_4 or may prevent delay of the pseudo-touch driving signals. In addition, a spacing IW_P-TBL among the plurality of pseudo-touch bridge lines P-TBL_1 and P-TBL_2 may be adjusted and, as such, an effect capable of blocking a radio signal received via an antenna may be enhanced.

In addition, one or more delay resistors Rd for temporal delay of a pseudo-touch driving signal may be disposed at each of the plurality of pseudo-touch electrode lines P-TEL_1 to P-TEL_4 extending from one pseudo-touch routing line P-TL.

In FIG. 10, the case in which two pseudo-touch bridge lines P-TBL_1 and P-TBL_2 are disposed at four pseudo-touch electrode lines P-TEL_1 to P-TEL_4, and three delay resistors Rd are disposed on each of the four pseudo-touch electrode lines P-TEL_1 to P-TEL_4 is illustratively shown.

In the touch display device 100 according to the example embodiment of the disclosure, a plurality of pseudo-touch routing lines P-TL is provided, and a plurality of pseudo-touch electrode lines P-TEL is disposed to extend from each of the pseudo-touch routing lines P-TL and, as such, it may be possible to increase an electromagnetic interference offset effect.

Figure 11:
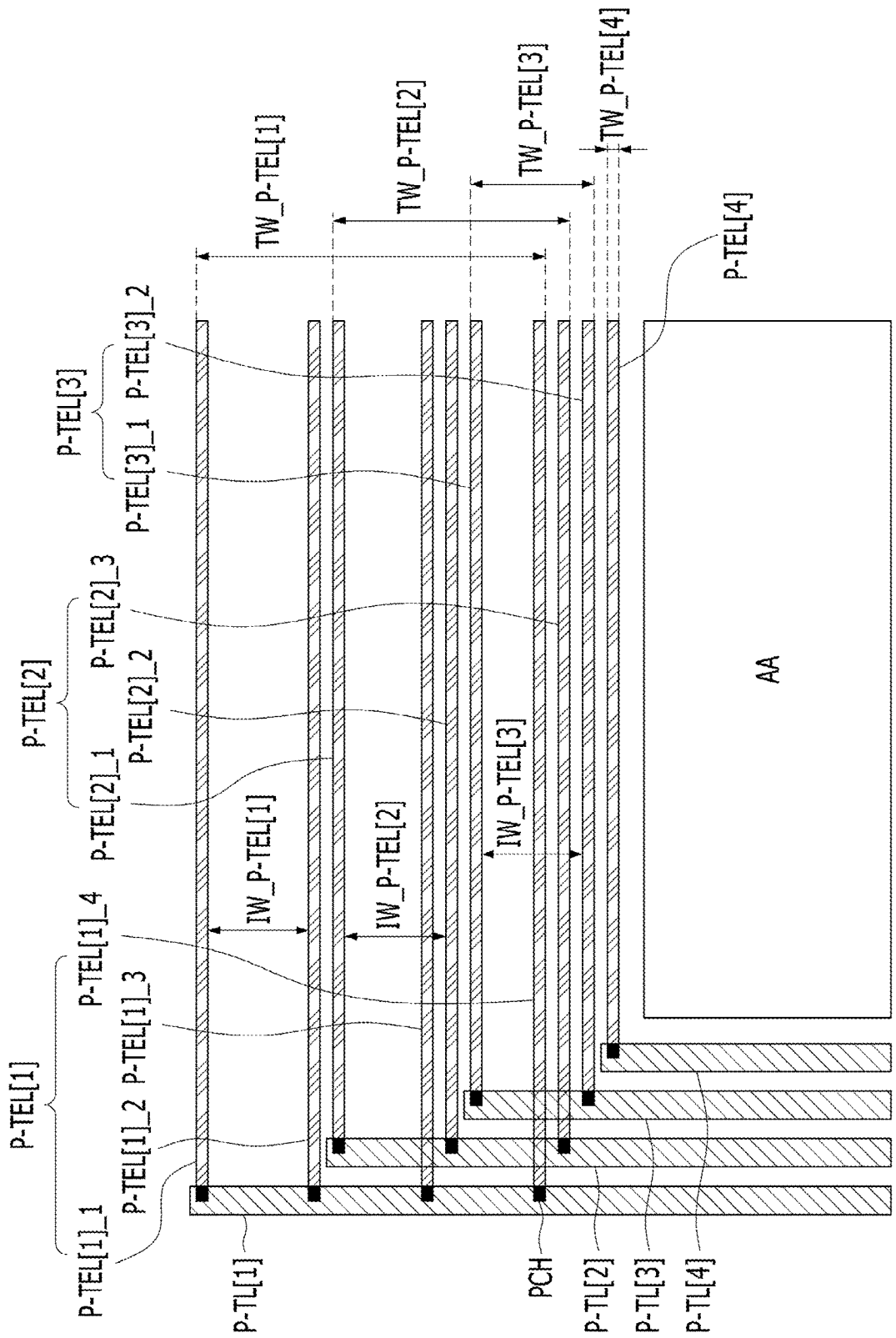
FIG. 11 is a view illustratively showing the case in which a plurality of pseudo-touch electrode lines is connected to each of a plurality of pseudo-touch routing lines in a touch display device according to an example embodiment of the disclosure.

FIG. 11 is a view illustratively showing the case in which a plurality of pseudo-touch electrode lines is connected to each of a plurality of pseudo-touch routing lines in a touch display device according to an example embodiment of the disclosure.

Referring to FIG. 11, in a touch display device 100 according to an example embodiment of the disclosure, a plurality of pseudo-touch routing lines P-TL[1] to P-TL[4] may be disposed to extend in a y-axis direction along a side surface of a display panel 110, and one or more pseudo-touch electrode lines P-TEL[1]_1 to P-TEL[1]_4, P-TEL[2]_1 to P-TEL[2]_3, P-TEL[3]_1, P-TEL[3]_2, and P-TEL[4] may extend from corresponding ones of pseudo-touch routing lines P-TL[1] to P-TL[4] in an x-axis direction parallel to a plurality of X-touch electrode lines X-TEL.

In this case, the one or more pseudo-touch electrode lines P-TEL[1]_1 to P-TEL[1]_4, P-TEL[2]_1 to P-TEL[2]_3, P-TEL[3]_1, P-TEL[3]_2, and P-TEL[4] extending from the corresponding pseudo-touch routing lines P-TL[1] to P-TL[4] may be disposed to be spaced apart from one another by corresponding ones of selected reference distances IW_P-TEL[1], IW_P-TEL[2] and IW_P-TEL[3], respectively.

For example, a plurality of first-group pseudo-touch electrode lines P-TEL[1]_1 to P-TEL[1]_4 extending from a first touch routing line P-TL[1] in the x-axis direction may be disposed to be spaced apart from one another by a first reference distance IW_P-TEL[1]. In this case, it is beneficial that the first reference distance IW_P-TEL[1] have a value smaller than the wavelength of a radio signal received through an antenna.

When the first reference distance IW_P-TEL[1], by which the plurality of first-group pseudo-touch electrode lines P-TEL[1]_1 to P-TEL[1]_4 are spaced apart from one another, is shorter than the wavelength of a radio signal, as described above, the radio signal received by the touch display device 100 via an antenna cannot pass through a space among the plurality of first-group pseudo-touch electrode lines P-TEL[1]_1 to P-TEL[1]_4.

In this case, the plurality of first-group pseudo-touch electrode lines P-TEL[1]_1 to P-TEL[1]_4 may be connected to the first pseudo-touch routing line P-TL[1] via respective contact holes PCH.

First reference distances IW_P-TEL[1], by which the plurality of first-group pseudo-touch electrode lines P-TEL[1]_1 to P-TEL[1]_4 are spaced apart from one another in a non-display area, respectively, may have the same value, or at least one of the first reference distances IW_P-TEL[1] may have a value different from that of the remaining first reference distances IW_P-TEL[1]. For example, a distance between pseudo-touch electrode lines P-TEL[1]_1 and P-TEL[1]_2 may be D1, a distance between pseudo-touch electrode lines P-TEL[1]_2 and P-TEL[1]_3 may be D2, and a distance between pseudo-touch electrode lines P-TEL[1]_3 and P-TEL[1]_4 may be D3, and each distance D1, D2, and D3 may be different from each other.

When widths of the plurality of first-group pseudo-touch electrode lines P-TEL[1]_1 to P-TEL[1]_4 are ignored, a value obtained by summing all of the first reference distances IW_P-TEL[1], by which the plurality of first-group pseudo-touch electrode lines P-TEL[1]_1 to P-TEL[1]_4 are spaced apart from one another, respectively, may correspond to a first total distance TW_P-TEL[1] occupied, in the non-display area, by the plurality of first-group pseudo-touch electrode lines P-TEL[1]_1 to P-TEL[1]_4 extending from the first pseudo-touch routing line P-TL[1]. That is, assuming that each of the width of first-group pseudo-touch electrode lines P-TEL[1]_1, P-TEL[1]_2, P-TEL[1]_3, and P-TEL[1]_4 is relatively small compared to the first reference distances IW_P-TEL[1], each of the width can be ignored and under this assumption, the first total distance TW_P-TEL[1] can be determined by the sum of the first reference distances IW_P-TEL[1] between P-TEL[1]_1 and P-TEL[1]_2, between P-TEL[1]_2 and P-TEL[1]_3, and P-TEL[1]_3 and P-TEL[1]_4 (i.e., TW_P-TEL[1]=about 3*IW_P-TEL[1]).

Accordingly, the radiation efficiency of the plurality of first-group pseudo-touch electrode lines P-TEL[1]_1 to P-TEL[1]_4 disposed to be spaced apart from one another by the first reference distance IW_P-TEL[1] is equal to that of one pseudo-touch electrode line P-TEL[1] formed to have an integrated structure while having a width equal to the first total distance TW_P-TEL[1].

A plurality of second-group pseudo-touch electrode lines P-TEL[2]_1 to P-TEL[2]_3 extending from a second touch routing line P-TL[2] in the x-axis direction may be disposed to be spaced apart from one another by a second reference distance IW_P-TEL[2]. In this case, at least one of the plurality of second-group pseudo-touch electrode lines P-TEL[2]_1 to P-TEL[2]_3 (for example, P-TEL[2]_1 and P-TEL[2]_2) may be disposed in a space among the plurality of first-group pseudo-touch electrode lines P-TEL[1]_1 to P-TEL[1]_4.

In addition, it is beneficial that the second reference distance IW_P-TEL[2] among the plurality of second-group pseudo-touch electrode lines P-TEL[2]_1 to P-TEL[2]_3 have a value smaller than the wavelength of a radio signal received through an antenna.

When the second reference distance IW_P-TEL[2], by which the plurality of second-group pseudo-touch electrode lines P-TEL[2]_1 to P-TEL[2]_3 are spaced apart from one another, is shorter than the wavelength of a radio signal, as described above, the radio signal received by the touch display device 100 via an antenna cannot pass through a space among the plurality of second-group pseudo-touch electrode lines P-TEL[2]_1 to P-TEL[2]_3.

In this case, the plurality of second-group pseudo-touch electrode lines P-TEL[2]_1 to P-TEL[2]_3 may be connected to the second pseudo-touch routing line P-TL[2] via respective contact holes PCH.

Second reference distances IW_P-TEL[2], by which the plurality of second-group pseudo-touch electrode lines P-TEL[2]_1 to P-TEL[2]_3 are spaced apart from one another in the non-display area, respectively, may have the same value, or at least one of the second reference distances IW_P-TEL[2] may have a value different from that of the remaining second reference distances IW_P-TEL[2].

When widths of the plurality of second-group pseudo-touch electrode lines P-TEL[2]_1 to P-TEL[2]_3 are ignored, a value obtained by summing all of the second reference distances IW_P-TEL[2], by which the plurality of second-group pseudo-touch electrode lines P-TEL[2]_1 to P-TEL[2]_3 are spaced apart from one another, respectively, may correspond to a second total distance TW_P-TEL[2] occupied, in the non-display area, by the plurality of second-group pseudo-touch electrode lines P-TEL[2]_1 to P-TEL[2]_3 extending from the second pseudo-touch routing line P-TL[2]. That is, assuming that each of the width of second-group pseudo-touch electrode lines P-TEL[2]_1, P-TEL[2]_2, and P-TEL[2]_3 is relatively small compared to the second reference distances IW_P-TEL[2], each of the width can be ignored and under this assumption, the second total distance TW_P-TEL[2] can be determined by the sum of the second reference distances IW_P-TEL[2] between P-TEL[2]_1 and P-TEL[2]_2, between P-TEL[2]_2 and P-TEL[2]_3 (i.e., TW_P-TEL[2]=about 2*IW_P-TEL[2]).

Accordingly, the radiation efficiency of the plurality of second-group pseudo-touch electrode lines P-TEL[2]_1 to P-TEL[2]_3 disposed to be spaced apart from one another by the second reference distance IW_P-TEL[2] is equal to that of one pseudo-touch electrode line P-TEL[2] formed to have an integrated structure while having a width equal to the second total distance TW_P-TEL[2].

A plurality of third-group pseudo-touch electrode lines P-TEL[3]_1 and P-TEL[3]_2 extending from a third touch routing line P-TL[3] in the x-axis direction may be disposed to be spaced apart from one another by a third reference distance IW_P-TEL[3]. In this case, at least one of the plurality of third-group pseudo-touch electrode lines P-TEL [3]_1 and P-TEL[3]_2 (for example, P-TEL[3]_1) may be disposed in a space among the plurality of second-group pseudo-touch electrode lines P-TEL[2]_1 to P-TEL[2]_3.

In addition, it is beneficial that the third reference distance IW_P-TEL[3] among the plurality of third-group pseudo-touch electrode lines P-TEL[3]_1 and P-TEL[3]_2 have a value smaller than the wavelength of a radio signal received through an antenna.

When the third reference distance IW_P-TEL[3], by which the plurality of third-group pseudo-touch electrode lines P-TEL[3]_1 and P-TEL[3]_2 are spaced apart from one another, is shorter than the wavelength of a radio signal, as described above, the radio signal received by the touch display device 100 via an antenna cannot pass through a space among the plurality of third-group pseudo-touch electrode lines P-TEL[3]_1 and P-TEL[3]_2.

In this case, the plurality of third-group pseudo-touch electrode lines P-TEL[3]_1 and P-TEL[3]_2 may be connected to the third pseudo-touch routing line P-TL[3] via respective contact holes PCH.

Third reference distances IW_P-TEL[3], by which the plurality of third-group pseudo-touch electrode lines P-TEL [3]_1 and P-TEL[3]_2 are spaced apart from one another in the non-display area, respectively, may have the same value, or at least one of the third reference distances IW_P-TEL[3] may have a value different from that of the remaining third reference distances IW_P-TEL[3].

When widths of the plurality of third-group pseudo-touch electrode lines P-TEL[3]_1 and P-TEL[3]_2 are ignored, a value obtained by summing all of the third reference distances IW_P-TEL[3], by which the plurality of third-group pseudo-touch electrode lines P-TEL[3]_1 and P-TEL[3]_2 are spaced apart from one another, respectively, may correspond to a third total distance TW_P-TEL[3] occupied, in the non-display area, by the plurality of third-group pseudo-touch electrode lines P-TEL[3]_1 and P-TEL[3]_2 extending from the third pseudo-touch routing line P-TL[3]. That is, assuming that each of the width of third-group pseudo-touch electrode lines P-TEL[3]_1 and P-TEL[3]_2 is relatively small compared to the third reference distances IW_P-TEL[3], each of the width can be ignored and under this assumption, the third total distance TW_P-TEL[3] can be determined by the third reference distance IW_P-TEL[3] between P-TEL[3]_1 and P-TEL[3]_2 (i.e., TW_P-TEL[3]= about 1*IW_P-TEL[3]).

Accordingly, the radiation efficiency of the plurality of third-group pseudo-touch electrode lines P-TEL[3]_1 and P-TEL[3]_2 disposed to be spaced apart from one another by the third reference distance IW_P-TEL[3] is equal to that of one pseudo-touch electrode line P-TEL[3] formed to have an integrated structure while having a width equal to the third total distance TW_P-TEL[3].

A fourth-group pseudo-touch electrode line P-TEL[4] extending from a fourth pseudo-touch routing line P-TL[4] in the x-axis direction may be provided. Here, the case in which the fourth-group pseudo-touch electrode line P-TEL [4] is constituted by one line is illustratively shown.

In this case, the fourth-group pseudo-touch electrode line P-TEL[4] may be connected to a fourth pseudo-touch routing line P-TL[4] via a contact hole PCH.

When one fourth-group pseudo-touch electrode line P-TEL[4] extends from the fourth pseudo-touch routing line P-TL[4], as described above, the width of the fourth-group pseudo-touch electrode line P-TEL[4] may correspond to a total distance TW_P-TEL[4] occupied by the fourth-group pseudo-touch electrode line P-TEL[4] in the non-display area.

In this case, it is beneficial that the first total distance TW_P-TEL[1] occupied by the plurality of first-group pseudo-touch electrode lines P-TEL[1]_1 to P-TEL[1]_4 in the non-display area be different from the second total distance TW_P-TEL[2] occupied by the plurality of second-group pseudo-touch electrode lines P-TEL[2]_1 to P-TEL [2]_3 in the non-display area.

For example, when the number of the first-group pseudo-touch electrode lines P-TEL[1]_1 to P-TEL[1]_4 is four, and the number of the second-group pseudo-touch electrode lines P-TEL[2]_1 to P-TEL[2]_3 is three, the first total distance TW_P-TEL[1] occupied by the first-group pseudo-touch electrode lines P-TEL[1]_1 to P-TEL[1]_4 in the non-display area may have a greater value than the second total distance TW_P-TEL[2] occupied by the second-group pseudo-touch electrode lines P-TEL[2]_1 to P-TEL[2]_3 in the non-display area.

In addition, when the number of the second-group pseudo-touch electrode lines P-TEL[2]_1 to P-TEL[2]_3 is three, and the number of the third-group pseudo-touch electrode lines P-TEL[3]_1 and P-TEL[3]_2 is two, the second total distance TW_P-TEL[2] occupied by the second-group pseudo-touch electrode lines P-TEL[2]_1 to P-TEL[2]_3 in the non-display area may have a greater value than the third total distance TW_P-TEL[3] occupied by the third-group pseudo-touch electrode lines P-TEL[3]_1 and P-TEL[3]_2 in the non-display area.

In addition, when the number of the third-group pseudo-touch electrode lines P-TEL[3]_1 and P-TEL[3]_2 is two, and the fourth-group pseudo-touch electrode line P-TEL[4] is constituted by one line, the third total distance TW_P-TEL[3] occupied by the third-group pseudo-touch electrode lines P-TEL[3]_1 and P-TEL[3]_2 in the non-display area may have a greater value than the fourth total distance TW_P-TEL[4] occupied by the fourth-group pseudo-touch electrode line P-TEL[4] in the non-display area.

The total distances TW_P-TEL[1], TW_P-TEL[2], TW_P-TEL[3] and TW_P-TEL[4] of the pseudo-touch electrode lines P-TEL[1], P-TEL[2], P-TEL[3] and P-TEL[4] of respective groups may have different values, respectively. In this case, radiation efficiencies of the pseudo-touch electrode lines P-TEL[1], P-TEL[2], P-TEL[3] and P-TEL[4] of respective groups may be different, respectively, and, as such, it may be possible to offset electromagnetic interference generated from the plurality of X-touch electrode lines X-TEL using various radiation efficiencies.

When one or more pseudo-touch electrode lines P-TEL [1]_1 to P-TEL[1]_4, P-TEL[2]_1 to P-TEL[2]_3, P-TEL [3]_1, P-TEL[3]_2, and P-TEL[4] extending from the plurality of pseudo-touch routing lines P-TL[1] to P-TL[4] are grouped into plural groups, as described above, the plurality of X-touch electrode lines X-TEL[1] to X-TEL[n] are divided into plural groups, and a pseudo-touch driving signal reverse in phase to a touch driving signal supplied through the X-touch electrode lines of respective groups may be applied to pseudo-touch electrode lines P-TEL[1]_1 to P-TEL[1]_4, P-TEL[2]_1 to P-TEL[2]_3, P-TEL[3]_1, P-TEL[3]_2, and P-TEL[4] of respective groups and, as such, electromagnetic interference caused by the touch driving signal may be offset.

Figure 12:
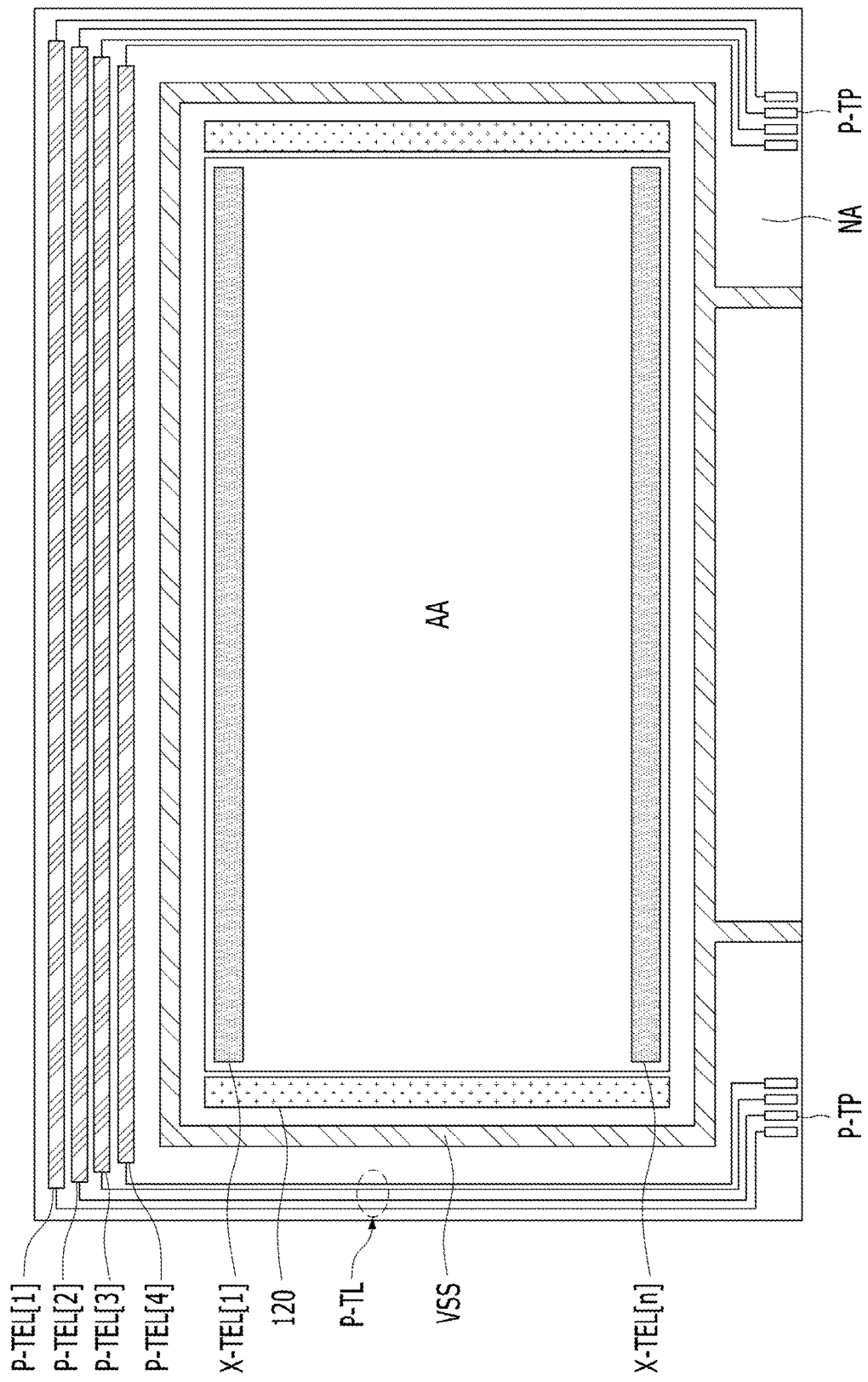
FIG. 12 is a plan view showing a pseudo-touch routing line and a pseudo-touch electrode line formed at a display panel in a touch display device according to an example embodiment of the disclosure.

FIG. 12 is a plan view showing a pseudo-touch routing line and a pseudo-touch electrode line formed at a display panel in a touch display device according to an example embodiment of the disclosure.

Referring to FIG. 12, in a touch display device 100 according to an example embodiment of the disclosure, a plurality of X-touch electrode lines X-TEL[1], X-TEL[2], X-TEL[3], . . . to X-TEL[n] (where n is a natural number) may be formed in a display area AA. A gate-in-panel (GIP) type gate driving circuit 120 may be formed in a non-display area NA surrounding the display area AA. A power line VSS may be formed outside the gate driving circuit 120, to surround the display area AA. In this case, the gate driving circuit 120 and the power line VSS may be made of the same material as a gate electrode GE of a first transistor T1 or a second transistor T2.

Referring to FIG. 12, in the touch display device 100 according to the example embodiment of the disclosure, a pseudo-touch routing line P-TL may be disposed at an outermost portion of the display panel 110. The pseudo-touch routing line P-TL may be formed to extend from a pseudo-touch pad P-TP in a y-axis direction along a side surface of the display panel 110 in the non-display area NA. In this case, the pseudo-touch routing line P-TL may be formed to be constituted by one line, as shown in FIG. 9. Alternatively, the pseudo-touch routing line P-TL may be formed to be constituted by a plurality of lines, as shown in FIG. 10.

A pseudo-touch electrode line P-TEL may be formed to extend from at least one pseudo-touch routing line P-TL. The at least one pseudo-touch electrode line P-TEL may be formed in the non-display area NA to extend in a direction parallel to the plurality of X-touch electrode lines X-TEL[1] to X-TEL[n]. In other words, the at least one pseudo-touch electrode line P-TEL may be formed to extend from the at least one pseudo-touch routing line P-TL in an x-axis direction.

The at least one pseudo-touch routing line P-TL and the at least one pseudo-touch electrode line P-TEL may be disposed at an outermost portion of the non-display area NA, so as not to overlap with the gate driving circuit 120 and the power line VSS at the display panel 110. In other words, in an area in which the at least one pseudo-touch routing line P-TL and the at least one pseudo-touch electrode line P-TEL are disposed, the at least one pseudo-touch routing line P-TL and the at least one pseudo-touch electrode line P-TEL do not overlap with any conductive material disposed thereover or thereunder. For instance, the at least one pseudo-touch routing line P-TL and the at least one pseudo-touch electrode line P-TEL do not vertically overlap with the various signal lines of the gate driving circuit 120 and the power line VSS. Accordingly, it may be possible to reduce generation of unnecessary parasitic capacitance by forming the at least one pseudo-touch routing line P-TL and the at least one pseudo-touch electrode line P-TEL at the outermost portion of the display panel 110.

That is, since the at least one pseudo-touch routing line P-TL and the at least one pseudo-touch electrode line P-TEL do not overlap with a conductive material such as the gate driving circuit 120 and the power line VSS, generation of coupling caused thereby may be prevented and, as such, electromagnetic interference caused by parasitic capacitance may be reduced.

Figure 13:
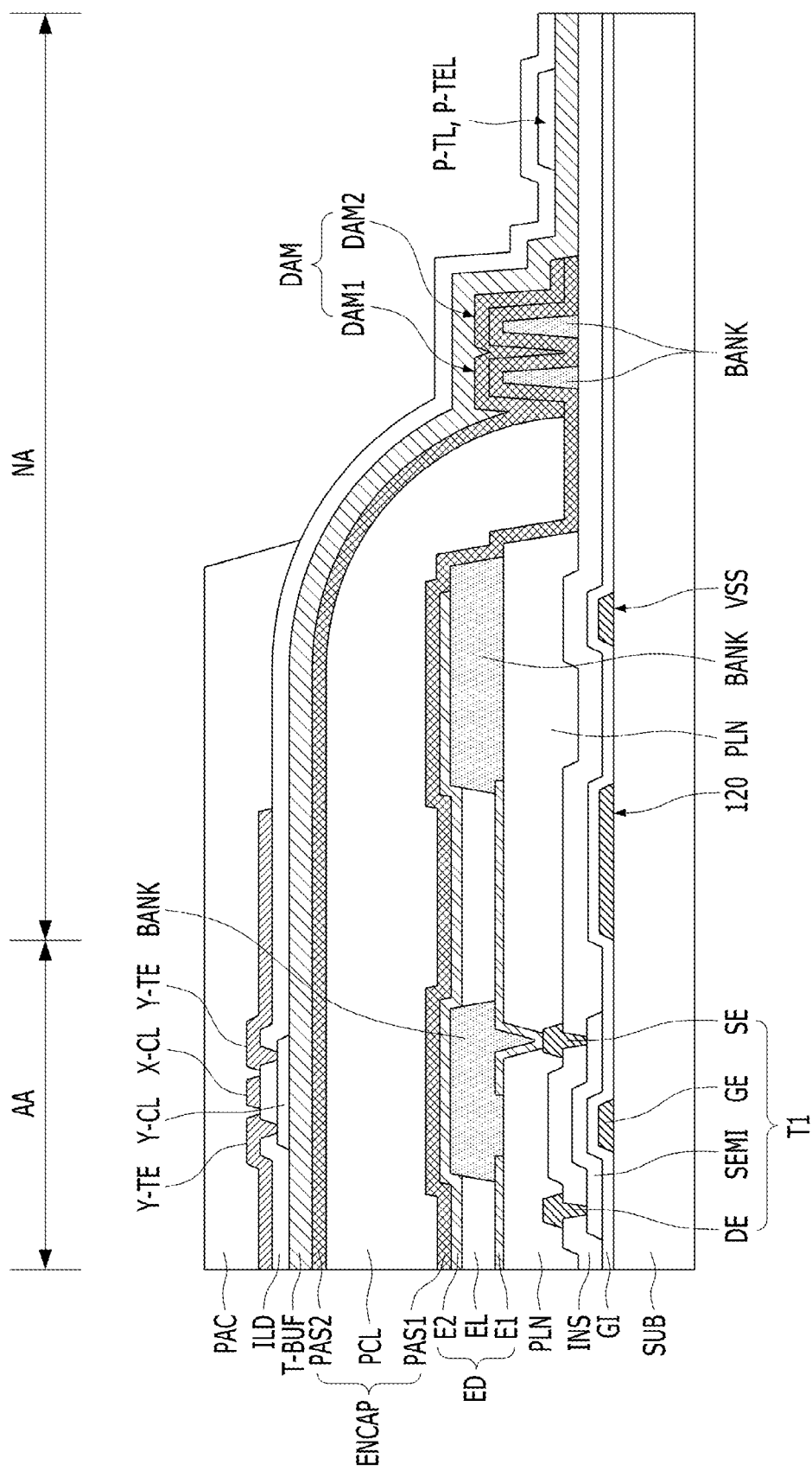
FIG. 13 is a sectional view showing a pseudo-touch routing line and a pseudo-touch electrode line formed at a display panel in a touch display device according to an example embodiment of the disclosure.

FIG. 13 is a sectional view showing a pseudo-touch routing line and a pseudo-touch electrode line formed at a display panel in a touch display device according to an example embodiment of the disclosure.

No detailed description of portions of the touch display device of FIG. 13 overlapping with those of FIG. 4 described in detail in the above description will be given.

Referring to FIG. 13, in a touch display device 100 according to an example embodiment of the disclosure, an encapsulation layer ENCAP may be disposed in a display area AA and a portion of a non-display area NA, and a touch buffer layer T-BUF may be disposed on the encapsulation layer ENCAP.

The touch buffer layer T-BUF may be formed to cover an end of the encapsulation layer ENCAP. When the encapsulation layer ENCAP is constituted by a plurality of stacked structures PAS1, PCL and PAS2, a first inorganic encapsulation layer PAS1 and a second inorganic encapsulation layer PAS2 may be formed such that side surfaces thereof are covered by the touch buffer layer T-BUF.

A touch sensor metal may be disposed on the touch buffer layer T-BUF in an area where the encapsulation layer ENCAP is disposed, and a pseudo-touch routing line P-TL and a pseudo-touch electrode line P-TEL may be disposed on the touch buffer layer T-BUF in an outermost portion of the non-display area NA. In other words, the pseudo-touch routing line P-TL and the pseudo-touch electrode line P-TEL may be formed not to overlap with the encapsulation layer ENCAP.

In addition, one, two, or more dams DAM may be formed to block an organic encapsulation layer PCL in a liquid state, and the first inorganic encapsulation layer PAS1 and the second inorganic encapsulation layer PAS2 may be formed to have a stacked structure on a bank BANK. That is, the pseudo-touch routing line P-TL and the pseudo-touch electrode line P-TEL may be formed not to overlap with the DAM.

In this case, a gate driving circuit 120 and a power line VSS may be formed between the display area AA and the dam DAM. In other words, the pseudo-touch routing line P-TL and the pseudo-touch electrode line P-TEL may be formed outside the dam DAM, and the gate driving circuit 120 and the power line VSS are formed inside the dam DAM and, as such, the pseudo-touch routing line P-TL and the pseudo-touch electrode line P-TEL may not overlap with the gate driving circuit 120 and the power line VSS. Accordingly, generation of coupling may be prevented and, as such, electromagnetic interference caused by parasitic capacitance may be reduced.

Figure 14:
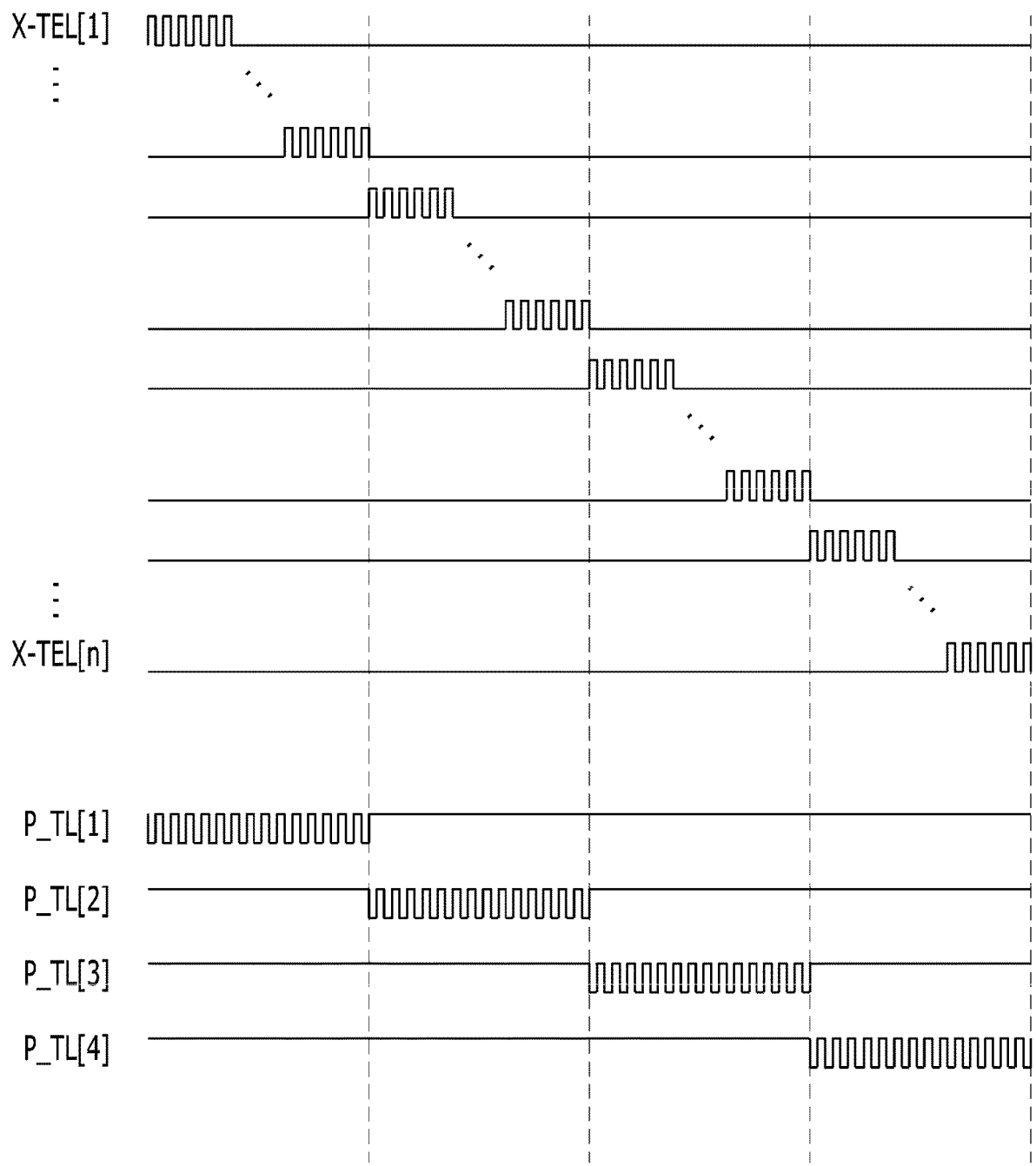
FIG. 14 is a diagram illustratively depicting waveforms of touch signals applied to a plurality of touch electrode lines grouped into plural groups and a plurality of pseudo-touch routing lines in a touch display device according to an example embodiment of the disclosure.

FIG. 14 is a diagram illustratively depicting waveforms of touch signals applied to a plurality of touch electrode lines grouped into plural groups and a plurality of pseudo-touch routing lines in a touch display device according to an example embodiment of the disclosure.

Referring to FIG. 14, in a touch display device according to an example embodiment of the disclosure, a plurality of X-touch electrode lines X-TEL may be disposed in a display area of a display panel, and a plurality of pseudo-touch routing lines P-TL may be disposed in a non-display area of the display panel. Here, the case in which n X-touch electrode lines X-TEL[1] to X-TEL[n] are provided, and four pseudo-touch routing lines P-TL[1] to P-TL[4] are provided is illustratively shown.

When the four pseudo-touch routing lines P-TL[1] to P-TL[4] are provided, the n number of X-touch electrode lines X-TEL[1] to X-TEL[n] may be divided into four groups so as to correspond to the four pseudo-touch routing lines P-TL[1] to P-TL[4].

In this case, pulse type touch driving signals may be applied to the n number of X-touch electrode lines X-TEL[1] to X-TEL[n] disposed in the display area of the display panel at different times, respectively.

Meanwhile, pseudo-touch driving signals reverse in phase to respective touch driving signals applied to the X-touch electrode lines X-TEL[1] to X-TEL[n] corresponding to the first to fourth pseudo-touch routing lines P-TL[1] to P-TL[4] are applied to first to fourth pseudo-touch routing lines P-TL[1] to P-TL[4]. For instance, if there are sixteen (16) X-touch electrode lines, i.e., X-TEL[1], X-TEL[2], X-TEL[3], X-TEL[15], and X-TEL[16] (where n is 16), since there are four pseudo-touch routing lines P-TL[1] to P-TL[4], the sixteen (16) X-touch electrode lines will be divided into four groups. Accordingly, a first group that will operate during the same period as the first pseudo-touch routing line P-TL[1] includes X-TEL[1], X-TEL[2], X-TEL[3], and X-TEL[4]; a second group that will operate during the same period as the second pseudo-touch routing line P-TL[2] includes X-TEL[5], X-TEL[6], X-TEL[7], and X-TEL[8]; a third group that will operate during the same period as the third pseudo-touch routing line P-TL[3] includes X-TEL[9], X-TEL[10], X-TEL[11], and X-TEL[12]; a fourth group that will operate during the same period as the fourth pseudo-touch routing line P-TL[4] includes X-TEL[13], X-TEL[14], X-TEL[15], and X-TEL[16]. As shown in FIG. 14, the first pseudo-touch routing line P-TL[1] carries a pseudo-touch driving signal that has a phase reverse with the touch driving signal that is carried in the touch electrode lines X-TEL[1], X-TEL[2], X-TEL[3], and X-TEL[4]. Similar operation is performed with respect to the rest of the pseudo-touch routing lines and the touch electrode lines as shown in the timing diagram of FIG. 14.

As the pseudo-touch driving signal reverse in phase to the touch driving signal supplied through the plurality of X-touch electrode lines X-TEL[1] to X-TEL[n] is applied to plural of pseudo-touch routing lines P-TL[1] to P-TL[4], as described above, electromagnetic interference caused by the touch driving signal may be offset.

In some embodiments, the touch driving signal reverse in phase to the touch driving signal supplied to the X-touch electrode lines X-TEL[1] to X-TEL[4] is applied first to the first pseudo-touch routing line P-TL[1] that is located furthest away from the display area AA. Then, the touch driving signal reverse in phase to the touch driving signal supplied to the X-touch electrode lines X-TEL[5] to X-TEL[8] is applied to the second pseudo-touch routing line P-TL[2] that is located the next furthest away from the display area AA. Then, the touch driving signal reverse in phase to the touch driving signal supplied to the X-touch electrode lines X-TEL[9] to X-TEL[12] is applied to the third pseudo-touch routing line P-TL[3] that is located the next furthest away from the display area AA. Lastly, the touch driving signal reverse in phase to the touch driving signal supplied to the X-touch electrode lines X-TEL[13] to X-TEL[16] is applied to the fourth pseudo-touch routing line P-TL[4] that is located closest to the display area AA. See FIGS. 11 and 14.

As a result, in the touch display device 100 according to the example embodiment of the disclosure, it may be possible to reduce electromagnetic interference between a radio signal and a touch driving signal by a pseudo-electrode disposed in a non-display area.

In addition, a pseudo-touch driving signal, which is reverse in phase to a touch driving signal, may be applied to the pseudo electrode disposed in the non-display area. Accordingly, electromagnetic interference caused by the touch driving signal may be offset.

The parallel arrangements of the various signal lines described herein are merely one example of arranging the signal lines within a display device. However, a person of ordinary skill in the art will readily appreciate that substantially parallel arrangements (e.g., not exactly parallel) of the signal lines or other arrangements of the signal lines can also have the same technical effect (e.g., offsetting electromagnetic interference caused by the touch driving signal, improving the blocking effect of a radio signal received through an antenna, reducing electromagnetic interference between a touch driving signal and a radio signal, etc.) described according to one or more embodiments of the display device.

As apparent from the above description, in accordance with the example embodiments of the disclosure, there is an effect capable of providing a touch display device having enhanced touch sensing performance through a reduction in electromagnetic interference caused by parasitic capacitance.

While the embodiments of the disclosure have been described with reference to the accompanying drawings, it should be understood by those skilled in the art that various modifications may be made without departing from the scope of the disclosure and without changing essential features thereof. Therefore, the above-described embodiments should be considered in a descriptive sense only and not for purposes of limitation. Therefore, the foregoing embodiments disclosed herein shall be interpreted as illustrative only but not as limitative of the principle and scope of the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch display device comprising:
   at least one touch electrode line disposed to partially overlap a display area of the display device, the at least one touch electrode line, in operation, carries a touch driving signal for driving a touch electrode coupled to the at least one touch electrode line; and
   at least one pseudo-touch electrode line disposed in a non-display area adjacent to the display area;
   wherein the at least one pseudo-touch electrode line, in operation, carries a pseudo-touch driving signal having a phase that is the reverse of a phase of the touch driving signal of the at least one touch electrode line, and wherein the at least one pseudo-touch electrode line is disposed outside of a power line.

2. The touch display device of claim 1, wherein the at least one pseudo-touch electrode line includes a first pseudo-touch electrode line and a second pseudo-touch electrode line spaced apart from each other at a first distance,
wherein the touch display device further includes at least one pseudo-touch bridge line electrically connected to the first pseudo-touch electrode line and the second pseudo-touch electrode line.

3. The touch display device of claim 2, wherein the at least one pseudo-touch bridge line includes a first pseudo-touch bridge line and a second pseudo-touch bridge line spaced apart from each other at a second distance,
wherein the first pseudo-touch bridge line overlaps the first pseudo-touch electrode line and the second pseudo-touch electrode line and electrically connects with the first pseudo-touch electrode line and the second pseudo-touch electrode line at locations of the overlap via respective contact holes.

4. The touch display device of claim 2, wherein the at least one pseudo-touch electrode line includes at least one delay resistor, that in operation, causes a temporal delay of the pseudo-touch driving signal.

5. The touch display device of claim 2, wherein the first distance is shorter than a wavelength of a radio signal received via an antenna of the touch display device.

6. The touch display device of claim 1, comprising at least one pseudo-touch routing line electrically connected to the at least one pseudo-touch electrode line, the at least one pseudo-touch routing line not vertically overlapping with any conductive material.

7. The touch display device of claim 6, wherein the at least one pseudo-touch routing line includes a first pseudo-touch routing line and a second pseudo-touch routing line between the first pseudo-touch routing line and the display area, the first and second pseudo-touch routing lines,
wherein a first pseudo-touch electrode line among the at least one pseudo-touch electrode line is electrically connected to and extends from the first pseudo-touch routing line in the first direction,
wherein a second pseudo-touch electrode line among the at least one pseudo-touch electrode line is electrically connected to and extends from the first pseudo-touch routing line, the second pseudo-touch electrode line being spaced apart from the first pseudo-touch electrode line by a first distance.

8. The touch display device of claim 7, wherein the first distance is shorter than a wavelength of a radio signal received via an antenna of the touch display device.

9. The touch display device of claim 7, wherein a third pseudo-touch electrode line among the at least one pseudo-touch electrode line is electrically connected to and extends from the second pseudo-touch routing line,
wherein the third pseudo-touch electrode line is between the second pseudo-touch electrode line and the display area.

10. The touch display device of claim 9, wherein the at least one pseudo-touch routing line includes a third pseudo-touch routing line adjacent to the first pseudo-touch routing line,
wherein a fourth pseudo-touch electrode line among the at least one pseudo-touch electrode line is electrically connected to and extends from the third pseudo-touch routing line,
wherein a fifth pseudo-touch electrode line among the at least one pseudo-touch electrode line is electrically connected to and extends from the third pseudo-touch routing line, the fifth pseudo-touch electrode line being spaced apart from the fourth pseudo-touch electrode line by a distance shorter than a wavelength of a radio signal received via an antenna of the touch display device.

11. The touch display device of claim 10, wherein the first pseudo-touch electrode line is disposed between the fourth pseudo-touch electrode line and the fifth pseudo-touch electrode line.

12. The touch display device of claim 1, wherein the at least one pseudo-touch electrode line includes a first pseudo-touch electrode line disposed closest to the display area, a third pseudo-touch electrode line disposed farthest from the display area, and a second pseudo-touch electrode line disposed between the first pseudo-touch electrode line and the third pseudo-touch electrode line,
wherein the third pseudo-touch electrode line, the second pseudo-touch electrode line, and the first pseudo-touch electrode line sequentially carries a pseudo-touch driving signal that has a phase reverse with the touch driving signal of the at least one touch electrode line.

13. The touch display device of claim 1, further comprising:
a dam that is disposed parallel to the at least one pseudo-touch electrode line at the non-display area,
wherein the dam is disposed between the at least one pseudo-touch electrode line and the display area.

14. The touch display device of claim 13, wherein the at least one pseudo-touch electrode line is parallel with the dam at the non-display area.

15. A touch display device comprising:
a display panel including a display area and a non-display area adjacent to the display area;
a plurality of X-touch electrode lines extending in a first direction on the display area of the display panel;
at least one pseudo-touch electrode line extending in the first direction on the non-display area of the display panel;
at least one pseudo-touch routing line extending in a second direction on the non-display area of the display panel and electrically connected to the at least one pseudo-touch electrode line; and
a gate-in-panel type gate driving circuit disposed inside the at least one pseudo-touch routing line in the non-display area,
wherein the at least one pseudo-touch electrode line does not overlap with the gate driving circuit.

16. The touch display device according to claim 15, wherein:
the plurality of X-touch electrode lines receive a touch driving signal, and
the at least one pseudo-touch electrode line receive a pseudo-touch driving signal through the at least one pseudo-touch routing line.

17. The touch display device according to claim 16, further comprising:
a plurality of Y-touch electrode lines extending in the second direction on the display area of the display panel and transmitting a touch sensing signal; and
a plurality of X-touch lines electrically connected to the plurality of X-touch electrode lines and transmitting the touch driving signal.

18. The touch display device according to claim 16, wherein the pseudo-touch driving signal is reverse in phase to the touch driving signal.

19. The touch display device according to claim 16, wherein:
the at least one pseudo-touch routing line comprises a plurality of pseudo-touch routing lines;
the at least one pseudo-touch electrode line is divided into plural groups at least comprising a first group of pseudo-touch electrode lines extending from a first pseudo-touch routing line among the plurality of pseudo-touch routing lines and a second group of pseudo-touch electrodes line extending from a second pseudo-touch routing line among the plurality of pseudo-touch routing lines, and
the plurality of X-touch electrode lines is divided into plural groups at least comprising a first group of X-touch electrode lines corresponding to the first group of pseudo-touch electrode lines and a second group of X-touch electrode lines corresponding to the second group of pseudo-touch electrode lines.

20. The touch display device according to claim 19, wherein a number of the pseudo-touch electrode lines in the first group of pseudo-touch electrode lines is different from a number of the pseudo-touch electrode lines in the second group of pseudo-touch electrode lines.

21. The touch display device according to claim 19, wherein:
a first pseudo-touch driving signal applied to the first group of pseudo-touch electrode lines is reverse in phase to the touch driving signal applied to the first group of X-touch electrode lines; and
a second pseudo-touch driving signal applied to the second group of pseudo-touch electrode lines is reverse in phase to the touch driving signal applied to the second group of X-touch electrode lines.

22. The touch display device according to claim 15, wherein one or more pseudo-touch electrode lines extend from each of the at least one pseudo-touch routing line.

23. The touch display device according to claim 22, wherein a plurality of pseudo-touch electrode lines extending from one of the at least one pseudo-touch routing line are interconnected by one or more pseudo-touch bridge lines.

24. The touch display device according to claim 22, wherein a plurality of pseudo-touch electrode lines extending from one of the at least one pseudo-touch routing line are spaced apart from one another by a distance shorter than a wavelength of a radio signal received by the touch display device via an antenna.

25. The touch display device according to claim 15, wherein each of the at least one pseudo-touch electrode line and the at least one pseudo-touch routing line does not overlap with a conductive material.

26. The touch display device according to claim 15, further comprising:
a power line disposed inside the at least one pseudo-touch routing line along the non-display area,
wherein the at least one pseudo-touch electrode line does not overlap with the power line.

27. A touch display device comprising:
an encapsulation layer at a display area and at least a portion of a non-display area adjacent to the display area;
a plurality of X-touch electrode lines and a plurality of Y-touch electrode lines on the encapsulation layer at the display area; and
at least one pseudo-touch electrode line at the non-display area,
wherein the at least one pseudo-touch electrode line, in operation, carries a pseudo-touch driving signal, and
wherein the at least one pseudo-touch electrode line does not overlap with a power line within the non-display area.

28. The touch display device according to claim 27, wherein the at least one pseudo-touch electrode line does not overlap with the encapsulation layer.

29. The touch display device according to claim 27, further comprising:
a dam in the non-display area,
wherein the at least one pseudo-touch electrode line does not overlap with the dam.

30. The touch display device according to claim 27, further comprising:
a gate-in-panel type gate driving circuit at the non-display area,
wherein the at least one pseudo-touch electrode line does not overlap with the gate driving circuit.

31. The touch display device according to claim 27, further comprising:
a power line disposed along the non-display area,
wherein the at least one pseudo-touch electrode line does not overlap with the power line.

32. The touch display device according to claim 27, wherein:
the plurality of X-touch electrode lines extends in a first direction and receives a touch driving signal;
the plurality of Y-touch electrode lines extends in a second direction and transmits a touch sensing signal; and
the at least one pseudo-touch electrode line is parallel to the plurality of X-touch electrode lines.

33. The touch display device according to claim 32, wherein the pseudo-touch driving signal reverses in phase to the touch driving signal.

34. The touch display device of claim 33, further comprising:
a Y-touch pad;
a touch driving circuit;
an insulation layer between a first electrode and a gate electrode of a transistor in the display area, the insulation layer continuously extending from the display area to the non-display area including a notch area,
wherein a Y-touch electrode line of the plurality of Y-touch electrode lines is electrically connected to the touch driving circuit via the Y-touch pad,
wherein the Y-touch pad contacts with the insulation layer at the notch area.

35. The touch display device of claim 34, further comprising:
a gate insulation layer between the gate electrode of the transistor and the insulation layer, the gate insulation layer continuously extending from the display area to the non-display area including the notch area,
wherein the Y-touch pad overlaps with both the insulation layer and the gate insulation layer at the notch area.

36. The touch display device of claim 27, wherein the at least one pseudo-touch electrode line is on a same layer as at least one of the plurality of X-touch electrode lines and the plurality of Y-touch electrode lines.

* * * * *